US009815577B2

(12) United States Patent
Clark et al.

(10) Patent No.: US 9,815,577 B2
(45) Date of Patent: Nov. 14, 2017

(54) BATCHING SYSTEM FOR USE IN A MULTIHEAD WEIGHING FOOD PACKING SYSTEM INCLUDING A BATCHING TABLE WITH A PLURALITY OF FILLING STATIONS

(71) Applicant: ISHIDA EUROPE LIMITED, Birmingham, West Midlands (GB)

(72) Inventors: Nickolas Martin Clark, West Midlands (GB); Ulrich Carlin Neilsen, Ry (DK)

(73) Assignee: ISHIDA EUROPE LIMITED, Birmingham (GB)

( * ) Notice: Subject to any disclaimer, the term of this patent is extended or adjusted under 35 U.S.C. 154(b) by 424 days.

(21) Appl. No.: 14/409,457

(22) PCT Filed: Jun. 20, 2013

(86) PCT No.: PCT/GB2013/051601
§ 371 (c)(1),
(2) Date: Dec. 18, 2014

(87) PCT Pub. No.: WO2013/190297
PCT Pub. Date: Dec. 27, 2013

(65) Prior Publication Data
US 2015/0191261 A1 Jul. 9, 2015

(30) Foreign Application Priority Data

Jun. 20, 2012 (GB) .................................. 1210921.1

(51) Int. Cl.
*G01G 19/393* (2006.01)
*B65B 5/06* (2006.01)
(Continued)

(52) U.S. Cl.
CPC .............. *B65B 5/068* (2013.01); *B65B 35/32* (2013.01); *B65B 35/40* (2013.01); *B65B 35/46* (2013.01);
(Continued)

(58) Field of Classification Search
CPC ........... B65B 5/068; B65B 7/02; B65B 35/32; B65B 35/40; B65B 35/46; B65B 37/18;
(Continued)

(56) References Cited

U.S. PATENT DOCUMENTS 2,633,970 A    1/1951  Robinson
4,428,179 A *  1/1984  Jordan ................ G01G 19/393
                                                        177/23
(Continued)

FOREIGN PATENT DOCUMENTS

EP    2084968 A1   8/2009
GB    2009084 A    6/1979

*Primary Examiner* — Randy Gibson
(74) *Attorney, Agent, or Firm* — Singularity LLP

(57) ABSTRACT

A batching system (200) for use in a food packaging system comprises a batching table (202) having a plurality of filling stations (206) positioned around an axis of a predefined delivery position. A weigher (204) is operable to provide food product in predefined batches at the delivery position; and a conveyor (230) is provided for transporting said batches provided from the weigher (204) to at least one of said plurality of filling stations.

32 Claims, 12 Drawing Sheets

(51) Int. Cl.
  *B65B 35/32* (2006.01)
  *B65B 67/00* (2006.01)
  *B65B 37/18* (2006.01)
  *B65B 67/02* (2006.01)
  *B65B 35/40* (2006.01)
  *B65B 35/46* (2006.01)
  *B65B 63/00* (2006.01)
  *B07C 5/22* (2006.01)
  *A22C 17/00* (2006.01)

(52) U.S. Cl.
  CPC .............. *B65B 37/18* (2013.01); *B65B 63/00* (2013.01); *B65B 67/02* (2013.01); *G01G 19/393* (2013.01); *A22C 17/0093* (2013.01); *B07C 5/22* (2013.01)

(58) Field of Classification Search
  CPC ........ B65B 63/00; B65B 67/02; G01G 19/22; G01G 19/346; G01G 13/00; G01G 19/38; G01G 19/387; G01G 19/393; B65G 11/203; B65G 2201/0202; B07C 5/16; B07C 5/18; B07C 5/22; B07C 2501/0081; B07C 2501/009; A22C 17/0093
  See application file for complete search history.

(56) References Cited

U.S. PATENT DOCUMENTS

| | | | | |
|---|---|---|---|---|
| 4,720,961 | A * | 1/1988 | Jordan | G01G 19/393 177/1 |
| 4,821,820 | A * | 4/1989 | Edwards | G01G 19/393 177/1 |
| 5,331,792 | A * | 7/1994 | Kitchen | B65B 37/005 53/244 |
| 5,340,949 | A * | 8/1994 | Fujimura | G01G 19/393 141/128 |
| 6,151,866 | A * | 11/2000 | Connell | G01G 19/38 209/657 |
| 6,262,377 | B1 * | 7/2001 | Nielsen | B65B 1/32 177/1 |
| 6,533,125 | B1 * | 3/2003 | Jensen | G01G 19/303 198/370.02 |
| 6,712,221 | B2 * | 3/2004 | Kvisgaard | B07C 5/18 177/25.11 |
| 7,004,331 | B2 * | 2/2006 | Tew | B07C 5/18 209/592 |
| RE40,797 | E * | 6/2009 | Asgeirsson | G01G 19/387 177/1 |
| 7,946,429 | B2 * | 5/2011 | Kennedy | B07C 5/38 198/456 |
| 8,632,379 | B2 * | 1/2014 | Van Den Nieuwelaar | A22C 17/0093 452/52 |
| 2005/0155978 | A1 | 7/2005 | Parets et al. | |
| 2015/0316407 | A1 * | 11/2015 | Clark | B07C 5/22 177/1 |

\* cited by examiner

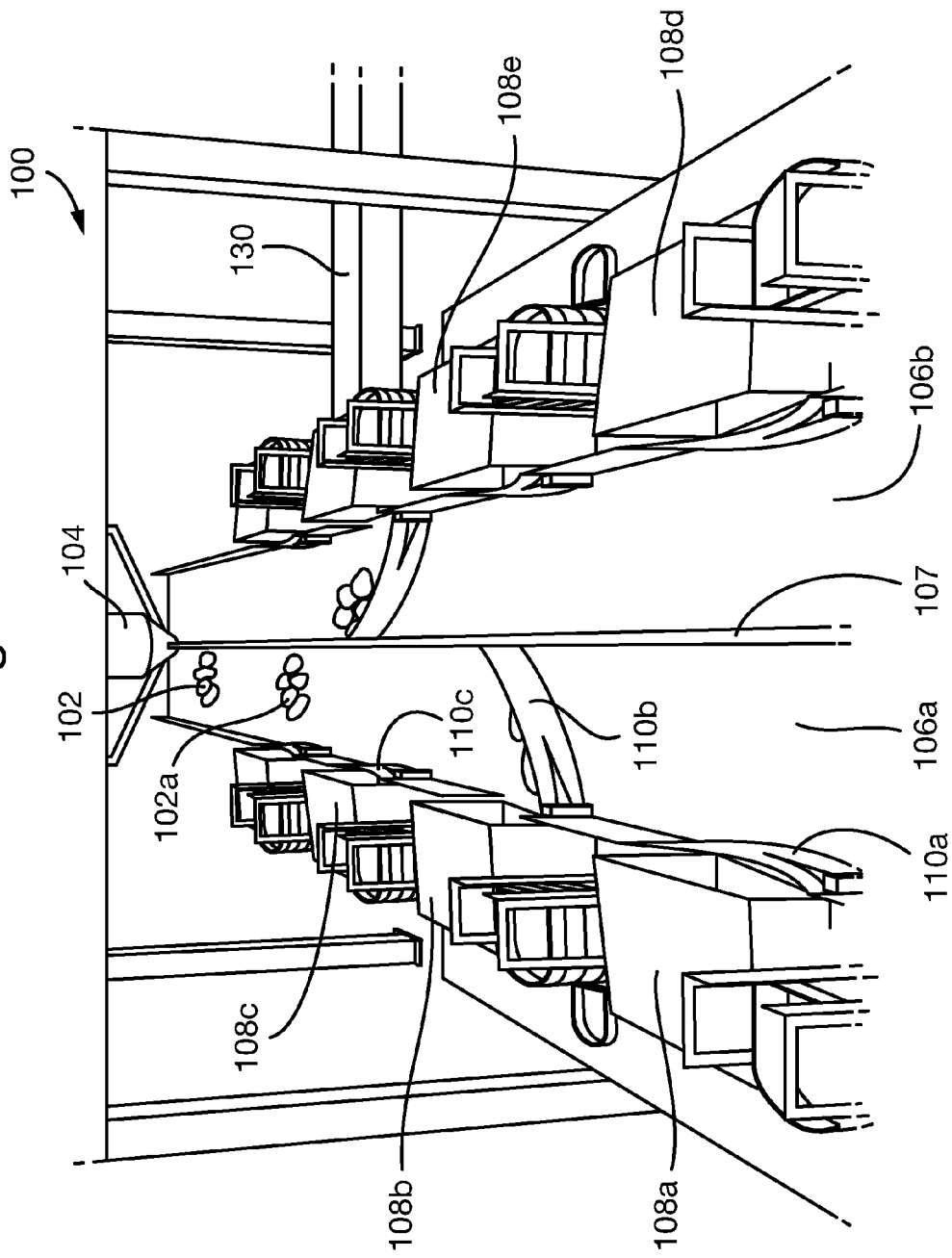

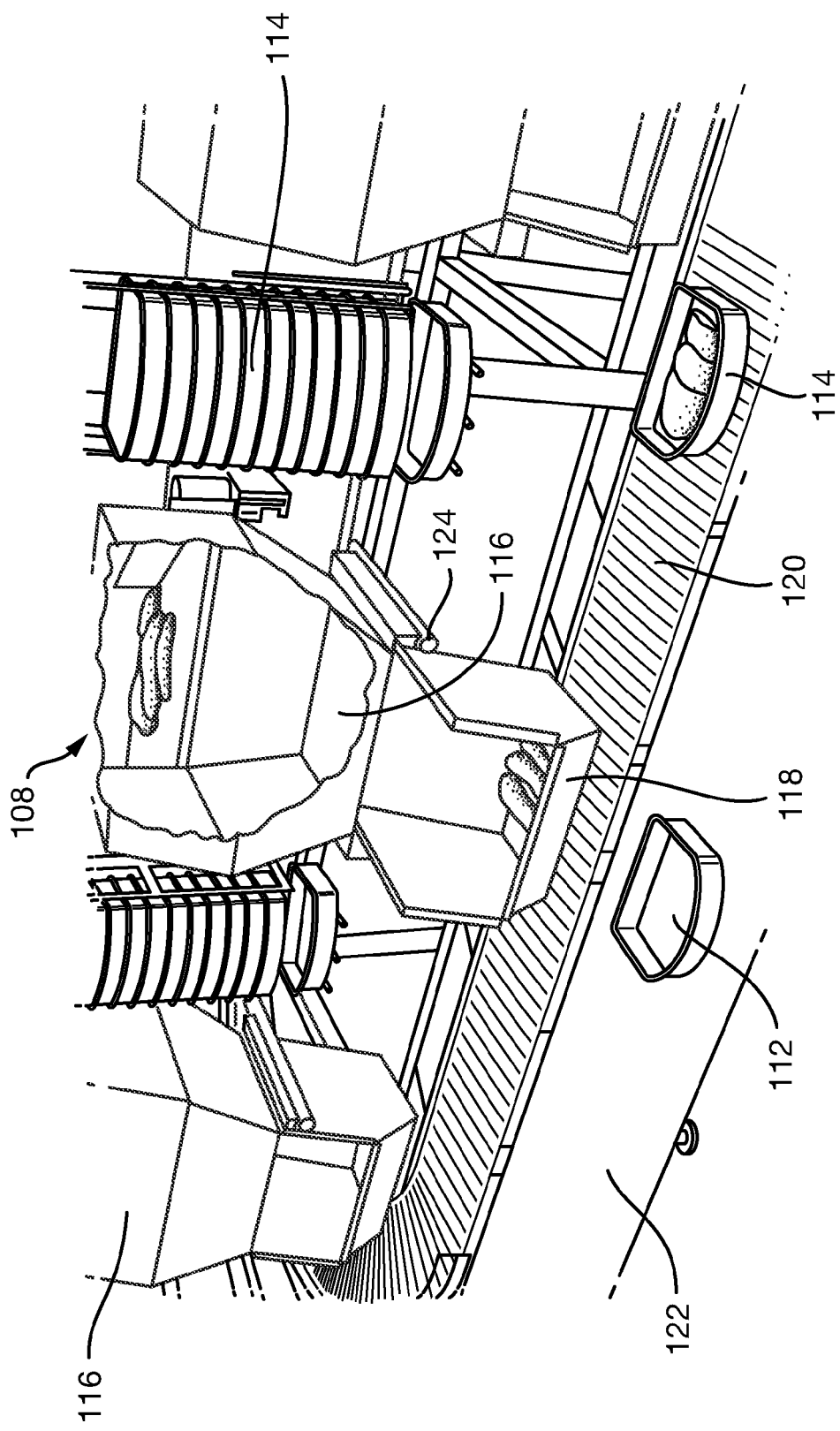

BATCHING SYSTEM FOR USE IN A MULTIHEAD WEIGHING FOOD PACKING SYSTEM INCLUDING A BATCHING TABLE WITH A PLURALITY OF FILLING STATIONS

FIELD OF THE INVENTION

This invention relates to production lines, in particular food packaging lines where food products are to be sorted into batches and packaged in containers. In this context "batch" refers to a controllable product size, for example a particular weight of food product to be packaged.

BACKGROUND TO THE INVENTION

In the food industry, it is common to package food in sealed trays, in particular meat and poultry products. When packaging such food into trays in batches, it is well known in the art to use a batching system, which enables operators to pack fixed weight batches of product into trays. The trays can then be sealed and labelled before being transported to the desired outlet, such as a supermarket.

Conventionally, batches of weighed product, for example a particular weight of chicken legs, are transferred from a weigher to conveyor system with arms that are timed to transfer the batches from the conveyor into individual filling stations. Each filling station typically comprises a holding tray and a pneumatically driven presentation tray.

Operators are positioned along a stationary batching table adjacent the conveyor system; one operator for each filling station. Product is presented immediately in front of an operator on the pneumatically driven tray. The operator picks the product and arranges it neatly on the tray. The operator then places the packed tray on to a secondary conveyor that transfers the tray to a tray sealing or over-wrapping machine. At the same time the operator places the filled tray on the secondary conveyor, they press a button and the batch held in the holding hopper is transferred to the pneumatic tray presented to the operator as before. In other systems, the timing of batches being presented to the operators is predetermined and the operators work at a set rate dictated by the tray timing.

The system is designed to run in a semi-automatic or automatic manner, such that when the weigher is given signals to provide batches of product, the system automatically distributes the product into the holding hoppers of the filling stations.

Typically the type of weigher used is a "multihead" weigher, which is equipped with multiple weighing hoppers equipped with software enabling multiple target weights to be achieved, together with an error system that automatically sends product not fulfilling the weight criteria (for example a selection of chicken legs with different weights such that the desired weight cannot be obtained) to a "bulk" station, where the product is either recycled and attempted to be weighed again, or sent to be packaged as "bulk".

Such a batching system is typically constructed in a linear fashion and requires a lot of space on the production floor. This means that there are high costs both in the manufacturing of the system and the floor space required. Further, due to the linear nature of the batching table and the operator positioning, the batches take longer to move along the conveyor system to an operator standing further away from the weigher than an operator standing closer to the weigher, which can lead to complicated timing requirements and low efficiency.

U.S. Pat. No. 6,625,961 describes an example of a bagging system in which bags are secured beneath vertical delivery chutes into which foodstuffs are supplied from a weighing system, the delivery chutes being arranged about a central axis. When filled, the bags are then placed onto a conveyor for delivery elsewhere. This system is not suitable for achieving tray filling since operators cannot control the supply of foodstuffs into the packages.

SUMMARY OF INVENTION

In accordance with a first aspect of the present invention, we provide a batching system for use in a food packaging system, said batching system comprising: a batching table having a plurality of filling stations positioned around an axis of a predefined delivery position; a weigher operable to provide food product in predefined batches at the delivery position; and means for transporting said batches provided from the weigher to at least one of said plurality of filling stations.

By providing a batching table having a plurality of filling stations, it is possible to allow operators to intervene in the filling of trays and the like while at the same time achieving the benefit of a more compact system.

Typically the predefined batches are determined by weight, although the batches can also be determined by physical dimensions or count.

The feature of the filling stations being positioned around an axis of a predefined delivery position advantageously means that the size of the system and the floor space required is vastly reduced compared to a linear system. As well as increasing efficiency, this also means that the system is easier to clean, improving hygiene.

Each filling station may be substantially equidistant from the axis of the predefined delivery position. This increases efficiency as the time taken for batches to move from the weigher to each operator at a filling station is the same.

The batches may be delivered to each filling station at predetermined time intervals controlled by a control system, with each operator working at a predetermined rate, for example six batches a minute. Alternatively, batches may be delivered to the filling stations on receipt of a signal from a filling station indicating that a batch is required.

The weigher may be a multihead weigher, and further may be a screw-feed multihead weigher. A screw-feed multihead weigher is particularly useful for weighing sticky food products (such as chicken) in to predefined batches. Other classifications of weigher such as grading checkweighers are also envisaged, however.

The filling stations may be positioned circumferentially around a substantially circular batching table. The substantially circular batching table may be coaxial with the axis of the predefined delivery position. This advantageously means that each filling station is equidistant from the predefined delivery position, as discussed above.

The batching table may be an incomplete annulus. The term "incomplete annulus" here means an annulus that is not fully closed, such that there is a gap between two open ends. The incomplete annular nature of the batching table allows further components of the batching system to be positioned on the inner side of the batching table, creating a compact batching system with a small floor footprint. Further, the incomplete annular nature of the batching table allows additional "modules" of a full food packaging system (such as a conveyor leading to a tray sealing machine, for example), to easily abut the batching system through the gap in the batching table, creating a compact and easily assembled overall system.

Each filling station may comprise at least one holding hopper for holding a batch. Each filling station is typically operated by an operator who manually places the batches received at a filling station into containers, for example trays on a food production line. The filling stations having a holding hopper advantageously increases the efficiency of the batching system, as a new batch can be immediately presented to the operator instead of having to wait for a new batch to be delivered from the weigher. If the filling station has two or more holding hoppers, the efficiency is further increased.

The means for transporting said batches may comprise a rotatable batch conveyor positioned between the weigher and the plurality of filling stations for transporting the batches provided from the weigher to any of the plurality of filling stations. Here the predefined delivery position is on the batch conveyor. The weigher may be positioned above the plane of the filling stations and the batch conveyor may be positioned between the weigher and filling stations such that the batches are deposited on to the batch conveyor from the weigher at the predefined delivery position. The vertical distances between the weigher and batch conveyor, and between the batch conveyor and filling stations, are preferably minimised so as to reduce damage to the batches when they are moved from one part of the batching system to another.

The rotatable batch conveyor advantageously removes the requirement for the "guiding arms" of a conventional linear batching apparatus. Such guiding arms can get food product caught between them and the conveyor, causing both delays as the problem is dealt with, and food hygiene issues.

The batch conveyor may be operable to transport batches to the at least one filling station one batch at a time.

The batching system may further comprise a bulk conveyor operable to receive at least one bulk batch from the batch conveyor. Preferably, the bulk conveyor is in the same plane as the batch conveyor and located such that the bulk conveyor and the batch conveyor abut one another at one rotation angle of the batch conveyor.

When the weigher is unable to produce a batch to the desired weight, such a batch is referred to as "bulk" batch. In such a case, the bulk batch is deposited on the rotatable batch conveyor which then rotates to a predetermined rotation angle such that it aligns with and abuts the bulk conveyor. The bulk batch is then transported on the bulk conveyor to be either recycled and weighed again, or sold as bulk. This advantageously reduces wastage of the system.

Alternatively, the batching system comprises a bulk station positioned adjacent the batching table and located such that the rotatable conveyor is operable to transport bulk batches from the weigher to the bulk station.

In embodiments, the batching system further comprises a delivery member for receiving batches from the weigher, and the means for transporting said batches comprises a rotatable conveyor system positioned between the weigher and the filling stations, said delivery member arranged so as to deposit batches received from the weigher on to the rotatable conveyor system; said rotatable conveyor system comprising a first batch conveyor and a second batch conveyor operable to transport batches to any of the plurality of filling stations; and wherein in a first mode the delivery member is configured to deposit batches on the first batch conveyor and in a second mode the delivery member is configured to deposit batches on the second batch conveyor.

The delivery member may be a timing hopper comprising an entry port, a first closable opening arranged to deposit batches on the first batch conveyor (in the first mode) and a second closable opening arranged to deposit batches on the second batch conveyor (in the second mode), and wherein the entry port is positioned at the delivery position. The closable openings are typically doors or hatches. However, other types of delivery member are envisaged, such as a chute comprising a door with two hinges such that the door opening on one hinge guides a batch to the first conveyor, and the door opening on the other hinge guides a batch to the second conveyor.

Preferably, the delivery member rotates in synchrony with the rotatable conveyor system. This means that the first closable opening deposits batches on the first conveyor and the second closable opening deposits batches on the second conveyor at any given angle of rotation of the rotatable conveyor system. The delivery member may be coupled to the rotatable delivery system such that it inherently rotates with the rotatable conveyor system. The delivery member may also be coupled to the weigher.

The delivery member may be automatically actuated to deposit batches on the conveyors at predetermined time intervals. Alternatively, the delivery member may be actuated in response to signals sent from the filling stations indicating that a batch is required at that filling station.

The weigher may be positioned above the plane of the filling stations with the rotatable conveyor system being positioned between the weigher and the filling stations.

The use of a conveyor system with first and second batch conveyors advantageously increases the speed at which batches can be transported from the weigher to the filling stations, thereby increasing efficiency and throughput of the system. A conveyor system comprising first and second batch conveyors is also particularly useful in the case where the weigher is weighing batches of different weights. For example, batches of a first weight can be deposited on the first conveyor and packed at a first set of filling stations, and batches of a second weight can be deposited on the second conveyor and packed at a second set of filling stations.

Preferably, the first batch conveyor is operable to transport batches to any of a first set of one or more filling stations, and the second batch conveyor is operable to transport batches to any of a second set of one or more filling stations. Advantageously, this means that batches can be transported to the filling stations more quickly and efficiently. Typically the first and second sets of filling stations will be independent; however, each batch conveyor is capable of rotating to align with any filling station such that if one conveyor breaks down or is out of use for maintenance or the like, batches can still be delivered to each filling station.

The second batch conveyor may be actuated only upon alignment with one of the second set of filling stations. This advantageously allows bulk batches to be deposited and accumulated on the second batch conveyor until such a time that the second batch conveyor is aligned with a filling station designated to receive bulk batches. This means that good batches can be transported to the filling stations on the first batch conveyor with minimum disruption caused by bulk batches being produced.

When aligned with one of the first set of filling stations, the second batch conveyor may be operable to transport a batch a predetermined distance, wherein said predetermined distance is less than the a distance between the delivery member and one of the first set of filling stations, and wherein when the second batch conveyor is aligned with one of the second set of filling stations, said second batch conveyor is operable to transport a batch to the filling station with which it is aligned. Advantageously, this allows bulk batches to be spatially indexed at predetermined regular intervals along the second batch conveyor until such a time when the second batch conveyor is aligned with a filling station designated to receive bulk batches.

Two or more filling stations may be designated to receive bulk batches, and these may be covered by a chute with a single opening adjacent the batch conveyors to further increase efficiency.

The first and second batch conveyors may be independently rotatable, and further may be independently controllable. This further increases the flexibility of how the batches are transported from the weigher to the filling stations.

A batching system comprising a rotatable conveyor system may further comprise a bulk conveyor operable to receive at least one bulk batch from the conveyor system, in order to reduce wastage of the system. Preferably, the bulk conveyor is in the same plane as the batch conveyor system and located such that the bulk conveyor and either the first or second batch conveyor abut one another at one rotation angle of the conveyor system.

Alternatively, the batching system comprises a bulk station positioned adjacent the batching table and located such that the conveyor system is operable to transport bulk batches from the weigher to the bulk station.

The means for transporting said batches may alternatively comprise a plate positioned between the weigher and the plurality of filling stations, said plate further comprising at least one moveable pusher operable to push a batch from the plate to a filling station. The plate may be a circular plate, and said at least one pusher may lie parallel to the plane of said circular plate; the pusher being extendable in a radial direction so as to push a batch from the plate to a filling station. Further, the plate may be rotatable as well as the pushers.

The weigher may be positioned above the plane of the filling stations and with the plate being positioned between the weigher and filling stations such that batches are deposited on to the plate from the weigher.

The present example may further comprise a bulk station positioned adjacent the batching table and located such that the pusher is operable to push a bulk batch to the bulk station.

Alternatively, the means for transporting said batches may comprise a rotatable chute coupled to the weigher, said chute having an entry port and an exit port and arranged so as to transport batches received from the weigher to any of the plurality of filling stations through the exit port, and wherein the entry port is positioned at the delivery position. Such a system advantageously reduces the number of moving parts in the system, increasing reliability and durability.

Rotation of the chute may position the exit port above at least one filling station, such that a batch is transported from the weigher to said filling station. Here, as the batches drop straight from the rotatable chute into the filling stations without coming into contact with any other apparatus, this not only increases the speed at which batches are transported from the weigher to the filling stations, but also improves the hygiene and cleanliness of the system.

Again, this example preferably further comprises a bulk station positioned adjacent the batching table and located such that at one position of the rotatable chute, the exit port is above said bulk station. Therefore, bulk batches can be deposited direct from the weigher into the bulk station.

The batching table may further comprise a rotatable plate positioned between the weigher and the filling stations, said plate comprising at least one via hole and a plurality of moveable scraper blades corresponding to the plurality of filling stations, and wherein; in use, rotation of the chute positions the exit port above the rotatable plate at a position above a filling station, and wherein the corresponding movable scraper balde is arranged so as to deflect the batch from the plate to the filling station through the via hole.

In embodiments, the rotatable plate may comprise a plurality of via holes corresponding to the number of filling stations. This advantageously increases the speed at which batches can be transported to the filling stations, thereby increasing throughput.

The batching system may further comprise a feed conveyor operable to transport containers filled with food product away from the batching system. Typically the feed conveyor is concentric to and adjacent the batching table, which allows the batching system to remain compact and require minimal floor space.

The batching system may further comprise a bulk station positioned adjacent the batching table and located such that the means for transporting said batches provided from the weigher to at least one of said plurality of filling stations is operable to transport bulk batches from the weigher to the bulk station.

In accordance with a second aspect of the present invention, there is provided a food packaging system comprising the batching system of any of the abovementioned embodiments of the first aspect. Such a food packaging system will typically comprises a tray sealer and labelling machine in addition to the batching system, for example.

In accordance with a third aspect of the present invention, there is provided a method of transporting batches of food product from a weigher to at least one of a plurality of filling stations, the method comprising operating a batching system according to the first aspect of the invention.

BRIEF DESCRIPTION OF THE DRAWINGS

Embodiments of the present invention will now be described and contrasted with the prior art with reference to the following drawings in which:

FIG. 1a is a perspective view of a batching system as is known in the art;

FIG. 1b is a further perspective view of a batching system as is known in the art;

DETAILED DESCRIPTION OF THE DRAWINGS

Figure 2:
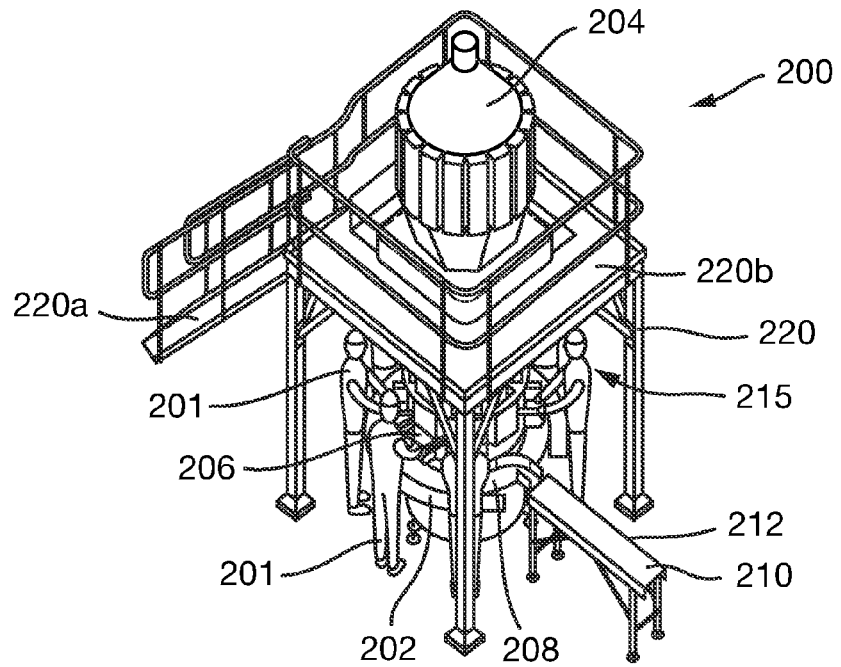
FIG. 2 is a perspective view of a batching system according to one embodiment of the present invention.

FIG. 1a is a perspective view of a part of a typical batching system 100 as is known in the art. Batches of food product 102 are weighed by a weigher (partially seen at 104) and deposited on to one of two conveyors 106a, 106b. In FIG. 1a the batches are a particular weight of chicken breasts. This particular batching system comprises two conveyors 106a, 106b separated by divider 107.

The conveyors are run in a direction away from the weigher 104 (out of the plane of the paper in the view of FIG. 1a), and pass a plurality of filling stations 108a, 108b, 108c, 108d, 108e. Each filling station 108 comprises a holding hopper 116 (see FIG. 1b) and a presentation tray 118.

Each filling station 108 also has an associated guiding arm 110a, 110b, 110c, 110d, 110e. Each guiding arm 110 is automatically operated to guide the food product to one of the filling stations. As seen in FIG. 1a, guiding arm 110c associated with filling station 108c is in the closed position such that the batches 102 can pass along the conveyor past filling station 108c. However, guiding arm 110b is in the open position extending across the width of the conveyor 106a. As such, when a batch reaches the guiding arm 110b it is directed off the conveyor 106a and into the holding hopper 116 of filling station 108b.

The guiding arms are independently operable, such that individual batches are guided to individual filling stations. For example, the particular batch shown at 102a may be required to be directed into filling station 108a. Therefore, guiding arms 110b and 110c will remain in the closed position whilst the guiding arm at 110a will move to the open position to guide the batch off the conveyor 106a and into the holding hopper 116 of filling station 108a.

With reference to FIG. 1b a typical filling station 108 as is known in the art will now be discussed in more detail. As discussed above, each filling station 108 comprises a holding hopper 116 and a presentation tray 118. The holding hopper 116 shown at the centre of FIG. 1b is shown in "cut-out" form, whilst the holding hopper 116 to the left of FIG. 1b is shown in complete form.

An operator (not shown) located at each filling station, when presented with food product in presentation tray 118, will take a tray 112 from tray de-nester 114 and place the food neatly into the tray on stationary batching table 122. The operator then places the packed tray onto feed conveyor 120 located adjacent the batching table. The tray 112 is then conveyed along feed conveyor where it is packaged and labelled before being transported to the desired outlet (for example a supermarket).

When the operator has placed the packed tray on to the feed conveyor 120, he presses button 124 which opens a gate (not shown) between the holding hopper 116 and presentation tray 118, causing the next batch to move from the holding hopper into the presentation tray. Alternatively this is done automatically at predetermined times, or a sensor senses when the presentation tray is empty and the next batch should be transferred to it. The operator then packs the next tray with food product. The guiding arms 110 are operated to guide a batch into the now-empty holding hopper 116 of that filling station. The guiding arms are typically automatically controlled by a control panel to guide batches to the filling stations at set times, with the operators expected to work at a certain speed.

The portions are typically defined in terms of weight, for example 300 g of chicken breast or 800 g of chicken thighs. If the weigher is unable to make up the desired weight with a particular batch of product, that batch is guided on to bulk conveyor 130 (see FIG. 1a) by automatically deployed guiding arm 130a (not shown) in the same manner as batches are guided into the filling stations as discussed above. The product directed onto the bulk conveyor is then either "recycled" and weighed again or sent to a bulk station. Product in the bulk station is not packaged into the trays.

As can be seen from FIG. 1a, the linear nature of the conveyors 106a, 106b requires a lot of room on the production floor, which increases rental cost as well as manufacturing costs. Further, product from the weigher takes longer to reach filling station 108a than 108c. This reduces the efficiency of the system.

Further, the guiding arms 110 are slightly vertically spaced from the conveyor 106 in order to enable them to move freely. This means that food product is prone to getting stuck between the arms and the conveyor. This is particularly the case for sticky foods such as chicken. This can mean that the batching system can frequently clog up and require intervention by the operators, therefore wasting time and reducing efficiency and throughput. In addition, food product getting caught between moving parts has negative implications for the food hygiene standards required in food packaging lines.

FIG. 2 shows a perspective overview of a batching system 200 according to one embodiment of the present invention. A plurality of operators 201 are positioned around a circular batching table 202. In this instance the batching table 202 accommodates seven operators simultaneously but it will be understood that such a batching system may accommodate more than seven, or fewer than seven, operators simultaneously depending on its size.

A screwfeed multihead weigher 204, such as manufactured by Ishida Europe Limited, is positioned above and coaxially aligned with the circular batching table. However, other weighers may be used. The manufacture and use of such weighers is well known in the art and will not be discussed further herein.

The batching table 202 takes the form of an incomplete annulus. In this context the term "incomplete annulus" means an annulus comprising a gap such that the batching table has two ends 202a, 202b (see FIG. 3). The batching system also comprises an annular feed conveyor 208 concentric to and adjacent the batching table 202 and positioned on the inner side of the batching table 202. The annular feed conveyor 208 is typically constructed of plastic, and may for example take the form of a polypropylene annular disk, or a series of interlocking plastic links. Alternatively, the feed conveyor 208 may be comprised of a plurality of overlapping rubber slats. Constructing the feed conveyor 208 from plastic advantageously reduces the noise of the batching system.

Preferably, the radius of the outer edge of the feed conveyor 208 is substantially identical to the inner radius of the batching table 202 such that there is no gap between the conveyor and batching table. However, other configurations are envisaged, for example in one embodiment there is a gap between the batching table 202 and the conveyor 208. The incomplete annular nature of the batching table allows a packaging conveyor 210 to extend through the gap and directly abut feed conveyor 208, as seen clearly in FIG. 3. This provides a compact batching system which not only saves spaces, but also allows simple integration of the batching system with other packaging line modules (in this case, the packaging conveyor may lead to a tray sealing module, for example). Modern day packaging lines are increasingly comprised of a number of independently produced and sold "modules", and therefore this feature of the present batching system provides a clear advantage.

The widths of the batching table and conveyor are chosen to fit the intended purpose of the production line. For example in a chicken factory the conveyor and batching table will have widths that accommodate the largest trays that will be run through the production line.

Figure 3:
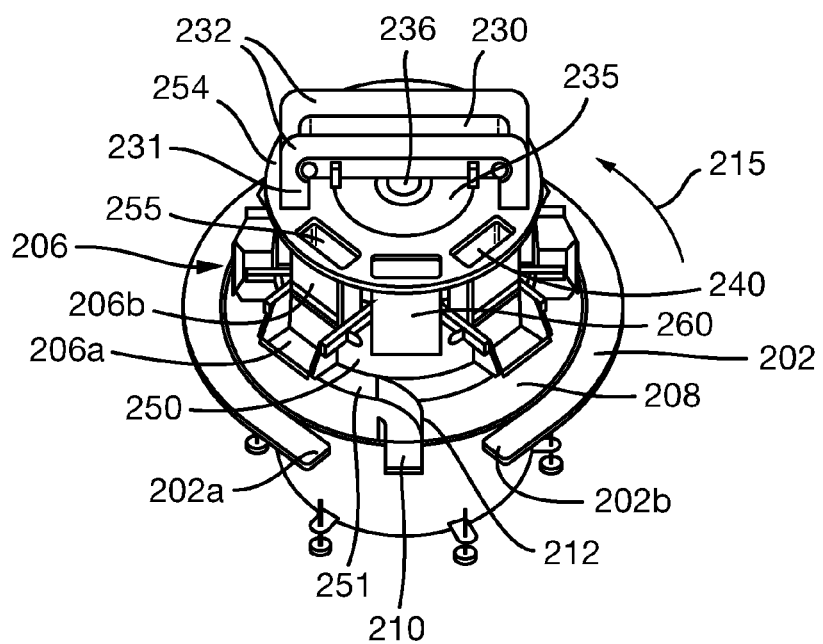
FIG. 3 is a perspective view of a batching system according to one embodiment of the present invention, showing the batch conveyor in more detail.

On the inner side of the feed conveyor 208 is a substantially cylindrical module 250. A flange 251 is positioned around the circumference of the module 250 where the module abuts the feed conveyor 208, providing a smooth interface between the module wall and the feed conveyor 208, as seen in FIG. 3. This prevents trays moving on the conveyor from snagging on the module. Positioned on the outer surface of the module 250 is a plurality of filling stations 206, more clearly seen in FIG. 3. Each filling station 206 comprises a holding hopper 206b and a presentation tray 206a. The number of filling stations 206 in a batching system 200 depends on the size of each filling station and the circumference of the module 250. In this embodiment there are seven filling stations positioned around the module 250. As the module 250 has a substantially circular cross section, the filling stations 206 are equidistant from the weigher 204. Other module cross sections are envisaged however, such as a square.

Surrounding the batching system is support structure 220 which holds the weigher above the module 250, batching table 202 and feed conveyor 208. The support structure 220 comprises ladder 220a leading to platform 220b surrounding weigher 204. This allows operator access to the weigher for maintenance purposes and the like.

In use, un-weighed food product such as diced chicken breast is fed into the weigher 204. The weigher is programmed to weigh certain weights of food product, for example 300 g of diced chicken breast, by making up combinations of the diced pieces of breast. Each weighed portion is termed a "batch". Once weighed, the weigher deposits the batch onto rotatable batch conveyor 230, which will be discussed in more detail below in relation to FIG. 3. It is also possible to program the weigher to produce a percentage of batches at a first weight, and a percentage of batches at a second weight. For example, the weigher may be capable of weighing 300 g of chicken breast and 500 g of chicken breast. The weigher is also capable of making combinations of both weights simultaneously and depositing whichever batch weight is required at that particular instant.

The batch conveyor 230 will now be described in more detail with reference to FIGS. 3 and 4. The weigher has been omitted from each of these figures for clarity purposes. An endless linear conveyor 230 is mounted to conveyor support 231. A circular plate 254 is mounted to the top of the module 250 as seen in FIG. 3. The circular plate has a larger radius than that of the module 250 such that it overhangs the outer edge of the module 250. Spaced around the outer perimeter of the circular plate 254 is a plurality of via holes 255 corresponding to the plurality of filling stations 206, as seen in FIG. 3. Each filling station 206 has a corresponding via hole 255.

The conveyor support 231 is mounted on rotatable plate 235 via a spindle 236. The conveyor support 231 is spaced from the circular plate 254 such that it can rotate freely. The rotatable plate 235 can rotate either clockwise or anti-clockwise, therefore rotating the batch conveyor 230. Alternatively, the plate 235 may be stationary and the spindle rotates, thereby rotating the conveyor support 231.

In use, a weighed batch from the weigher is deposited on the batch conveyor 230. Typically the batch will be deposited onto the centre of the batch conveyor 230. At the beginning of the batching process there will be no batches in the filling stations 206 (here labelled 401 to 407), and so the batch conveyor 230 will be operated to transport the batches from the weigher to each of the filling stations. For example, in FIG. 4, the rotatable plate 235 is positioned such that the conveyor is positioned between filling stations 402 and 406. As discussed earlier, each filling station 206 has a corresponding via hole in circular plate 254, and the batch conveyor 230 has a length corresponding to the distance between two opposing via holes. As the conveyor is linear, the filling stations are positioned in opposing pairs, as clearly shown in FIG. 4. However, other arrangements of the filling stations around module 250 are envisaged.

Figure 4:
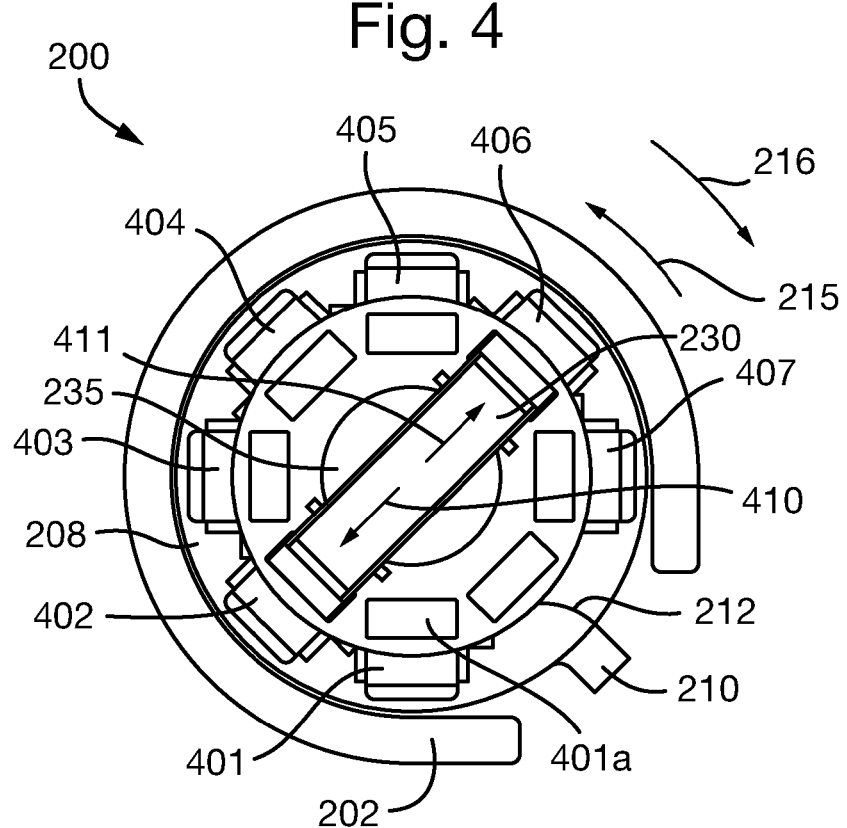
FIG. 4 is a plan view of a batching system according to a first embodiment of the present invention, showing the batch conveyor in more detail.

FIG. 4 shows conveyor 230 positioned between filling stations 402 and 406. When transporting a batch to filling station 402, the weighed batch will be deposited on to batch conveyor 230. The conveyor 230 will then be run in direction 410 such that the batch moves along the conveyor towards via hole 402a. At the end of the batch conveyor 230, the batch falls from the conveyor through via hole 402a and into the holding hopper of filling station 402. Flanges 232 of conveyor support 230 protrude above the level of the batch conveyor and aid in guiding the batches. The batch is then moved manually or automatically from the holding hopper into the presentation tray, from where the operator can pack the batch into a tray.

If the batch conveyor is instead run in the opposite direction 411, the batch is transported to filling station 406. When initially transporting the batches to the filling station, the batch conveyor 230 may move between each filling station and the conveyor run in one direction only. For example, if the rotatable plate 235 is rotated clockwise and the conveyor run in direction 410, then the batches will be transported to the filling stations in the order 402, 403, 404, 405 . . . .

Alternatively, at each angular position, the conveyor may be run firstly in direction 410 and then in direction 411. In the configuration shown in FIG. 4, a first batch will be deposited and transported to filing station 402 through via hole 402a as described above. Once this has occurred, the conveyor will switch to run is direction 411 and a second batch will be deposited onto batch conveyor 230 which will accordingly be transported to filling station 406 through via hole 406a. In such a protocol batches will be transported to the filling stations in the order 402, 406, 403, 407 . . . .

The batches are deposited onto batch conveyor 230 and delivered to the filling stations one at a time. Alternatively however, the batches may be delivered on to the batch conveyor such that there are two or more batches on the conveyor at one time. The batches may be deposited as the batch conveyor 230 is rotating, or alternatively they may be deposited when the batch conveyor is at the required angular position. The conveyor may be run continuously or may be stopped when the rotatable plate 235 is rotating. Further, the rotatable plate 235 may rotate either in a continuous fashion or in discrete steps corresponding to the angular separation of the filling stations 206. For example, in FIG. 4 the conveyor is in a first position. If it were to be rotated through a discrete angle such that it extended between filling stations 403 and 407 then it would be in a second position.

In use, each operator takes a tray from a tray de-nester or stack of trays (not shown) and fills the tray with the batch in the presentation tray 206a of his respective filling station. This takes place on the batching table 202. The operator then places the filled tray onto feed conveyor 208. The feed conveyor 208 rotates in an anti-clockwise direction 215, transporting the filled trays via guide 212 onto packaging conveyor 210. The filled trays are then conveyed on packaging conveyor 210 to the remainder of the food packaging system, where they can then be sealed, labelled and transported as desired. The packaging conveyor 210 abuts the feed conveyor 208 in the gap of the incomplete annular batching table 208, providing a compact and space-saving batching system. The reduced size of the batching system also aids in keeping it clean, improving hygiene. Of course, the conveyor 208 may be run in a clockwise direction, in which case the guide 212 would be positioned the other side of packaging conveyor 210.

When the operator has packed the batch from the presentation tray 206a into the tray from the de-nester, the batch held in the holding hopper is either manually or automatically moved into the presentation tray 206a. The operator then presses a button (not shown) indicating that the holding hopper 206b is now empty. The conveyor and rotatable plate 235 are programmed to operate such that that particular filling station is then provided with another batch as soon as possible. Alternatively, the holding hopper may comprise sensors that signal when it is empty, prompting a batch to be transported to that filling station as soon as possible. In one embodiment, batches are provided to the filling stations at set time intervals, as controlled by a control system (not shown). In such an instance, the operators are expected to work at a set speed.

A large advantage of the batching system of the present invention is that each filling station is equidistant from the weigher. This means that, assuming each operator works at the same speed, the batches are able to be transported to the filling stations in a known order at a known speed, without the requirement for the operators to indicate when their holding hopper is empty. This increases efficiency and throughput.

Figure 5:
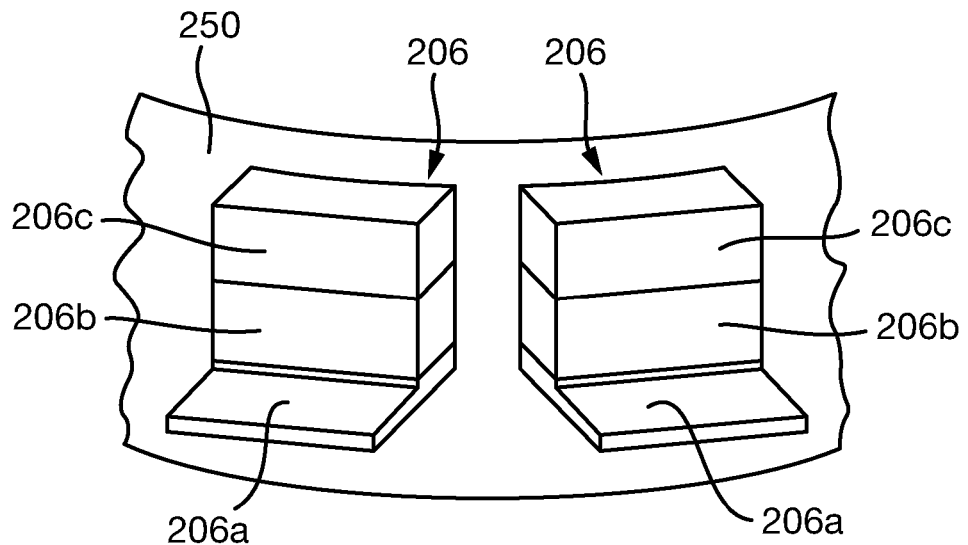
FIG. 5 is a schematic view of a batching system comprising filling stations with two holding hoppers.

In the above-described embodiment, each filling station 206 comprises a presentation tray 206a and a holding hopper 206b. In a further embodiment illustrated schematically in FIG. 5, each filling station comprises a further holding hopper 206c positioned above holding hopper 206b. There is a gate provided between the holding hoppers 206b and 206c which is manually or automatically actuated to move batches from holding hopper 206c to holding hopper 206b.

In the case of two holding hoppers, batches from the weigher are transported to the filling stations in the same manner as described previously, and it is possible for a filling station to have a batch in each of the presentation tray 206a, first holding hopper 206b and second holding hopper 206c. This advantageously allows the batch conveyor to transport batches to the filling stations in a more efficient manner. Further, as each filling station has the capability to have two batches waiting to be presented to the operator in the presentation tray, having two holding hoppers substantially reduces or eliminates any "dead time" whereby operators have no batches to put in trays. It is envisaged that in some embodiments each filling station comprises more than two hoppers.

As discussed hereinabove, the weigher is capable of simultaneously producing batches of different weights. If, for example, filling station 401 is being used for 300 g batches of chicken breast and filling station 402 is being used for 500 g batches of chicken breast; when a 300 g batch is deposited onto batch conveyor 230 it will be transported to filling station 401, and when a 500 g batch is deposited onto batch conveyor 230 it will be transported to filling station 402. Likewise, if the holding hopper 401 is empty then a 300 g batch will be weighed and transported as necessary, and if the holding hopper 402 is empty, a 500 g batch will be weighed and transported as necessary.

The weigher 204 is not always capable of producing batches at a correct weight. For example, the desired weight of a pack of four chicken thighs might be 800 g. Ideally, each thigh would weigh 200 g, but the natural variation in the size of the chicken thighs means that this happens rarely. Therefore, an 800 g batch might be made up of pieces weighing 185 g, 205 g, 210 g and 200 g for example. However, there are occasions when it is not possible to make up an 800 g (within tolerance). This might happen if there is a particularly large thigh, for example 250 g, which cannot be combined with three other thigh pieces to make 800 g. In such an instance, batch is referred to as a "bulk" batch and will not be transported to any filling station. Instead it will be transported on conveyor 230 to a "bulk" store where it can either be "recycled" and weighed again, or simply distributed as bulk product.

In one embodiment, a bulk conveyor (not shown) is provided in the same plane and at the same height as the batch conveyor 230. When a bulk batch is deposited onto the batch conveyor, the batch conveyor rotates such that it abuts the bulk conveyor. The batch is then transported along the bulk conveyor to the bulk storage (not shown). Alternatively, one of the filling stations is adapted to serve as the bulk storage. In such a case, the so-called "bulk station" will not comprise a presentation tray, and will have an enlarged holding hopper.

Figure 6:
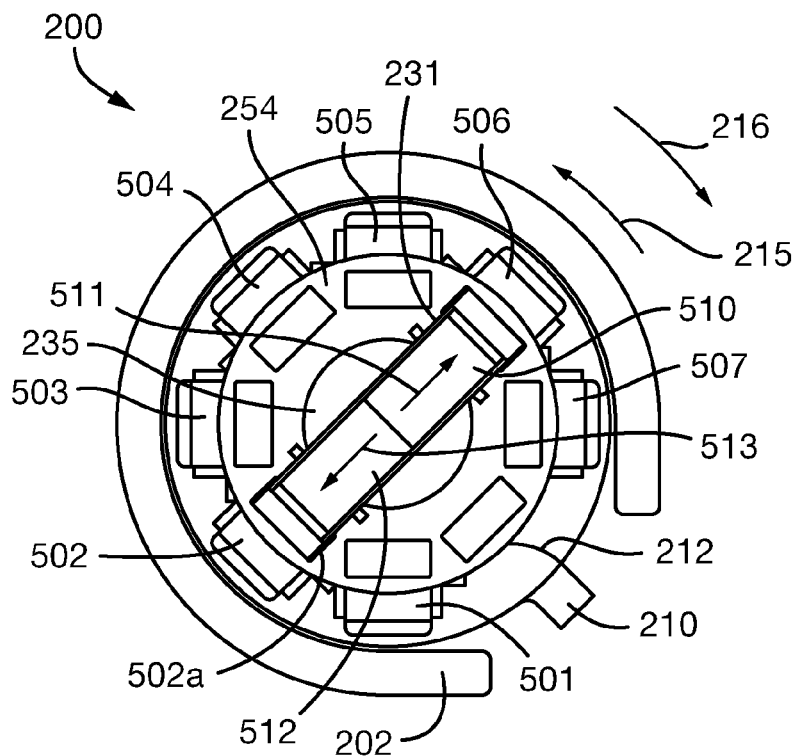
FIG. 6 is a plan view of a batching system according to a second embodiment of the present invention, showing the conveyor system in more detail.

FIG. 6 is a plan view of a batching system 200 (although the weigher is not shown) similar to that seen in FIG. 4. However, instead of a single endless batch conveyor 230 mounted on conveyor support 231, the batching system 200 shown in FIG. 6 has separate endless batch conveyors 510 and 512. These conveyors are mounted on conveyor support 231 as in the embodiment of FIG. 4, and the conveyor support 231 is mounted on rotatable plate 235 allowing the support 231 to rotate. Like numbers in FIGS. 2 to 6 represent like parts.

Batch conveyors 510 and 512 are positioned radially on the rotatable plate 235 and are arranged opposed and in line with each other and abut one another at one end, as seen in FIG. 6. The relative orientation of the conveyors 510, 512 is fixed such that at any angle of rotation, the conveyors 510, 512 oppose each other and abut one another at one end. Batch conveyor 510 is configured to run in one direction 511 and batch conveyor 512 runs in the opposite direction 513. The running direction of each batch conveyor is radially from the centre of rotatable plate 235 to the circumference edge of circular plate 254. The batch conveyors abut one another in substantially the centre of the elongate length of conveyor support 231.

In the current embodiment, conveyor 510 is associated with one set of filling stations, and conveyor 512 is associated with a second, different set of filling stations. For example, in FIG. 6 batch conveyor 510 is operable to transport batches to any of filling stations 504, 505, 506 or 507; and batch conveyor 512 is operable to transport batches to any of filling stations 501, 502 or 503. This advantageously means that the batch conveyors do not need to constantly switch running direction, thus increasing the durability of the system and also increasing the speed at which batches can be distributed from the weigher to the filling stations. However, the conveyor support 231 is rotatable such that if one of the conveyors breaks down or is stopped for maintenance reasons, the other conveyor is operable to transport batches to each filling station.

Each batch conveyor 510, 512 can be run continuously, which optimises batch transport speed, or only run when required, which decreases power consumption. For example, in the view of FIG. 6, if a batch were to be required at filling station 506, conveyor 510 would be running whereas conveyor 512 would be stationary. In one embodiment, the batch conveyors are stationary when moving between different filling stations.

Figure 7:
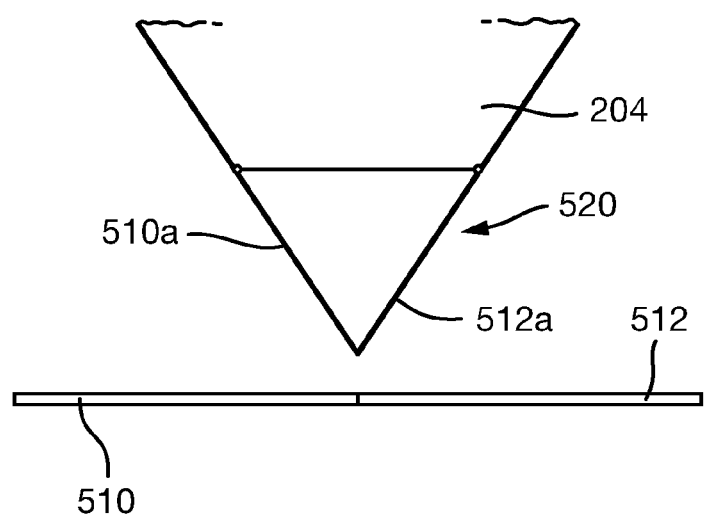
FIG. 7 is a schematic view of a timing hopper used in the second embodiment of the present invention.

When using a double batch conveyor system as seen in FIG. 6, the weigher 204 further comprises a triangular timing hopper 520 comprising two angled doors 510a and 512a which oppose each other as shown schematically in FIG. 7. A batch is deposited into the timing hopper 520 from weigher 204. Due to the angled orientation of the doors with respect to the conveyors, if door 510a is opened, the batch will fall on to conveyor 510. Similarly, if door 512a is opened, the batch will fall onto conveyor 512. Therefore, through the use of the doors in the timing hopper 520, if a batch is required at any of filling stations 504, 505, 506 or 507, the batch is deposited on conveyor 510 by opening door 510a, whereas if the batch is required at any of stations 501, 502 or 503, it is deposited on conveyor 512 by opening door 512a. The timing hopper 520 rotates in synchrony with the batch conveyors 510, 512 such that the two angled doors 510a, 512a are constantly aligned with their respective conveyors. In one embodiment, the timing hopper 520 is rigidly coupled to the conveyor support 231 such that it rotates in unison with the conveyors.

The filling stations of system 200 preferably comprise two holding hoppers as explained above in relation to FIG. 5. The batching system 200 seen in FIG. 6 may also comprise a bulk conveyor or adapted bulk station as discussed hereinabove in relation to batching system 100.

Figure 15A:
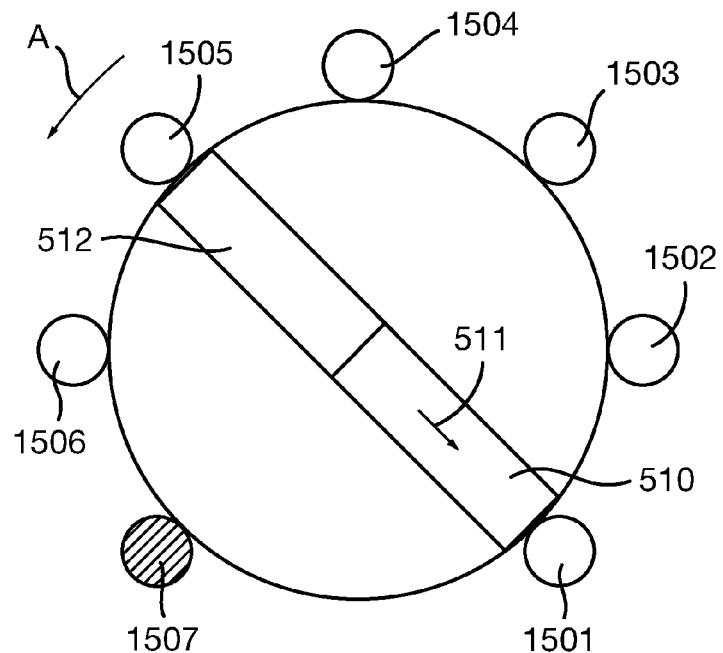
FIG. 15a is a schematic view of a batching system arrangement for use in the second and third embodiments of the invention.
Figure 15B:
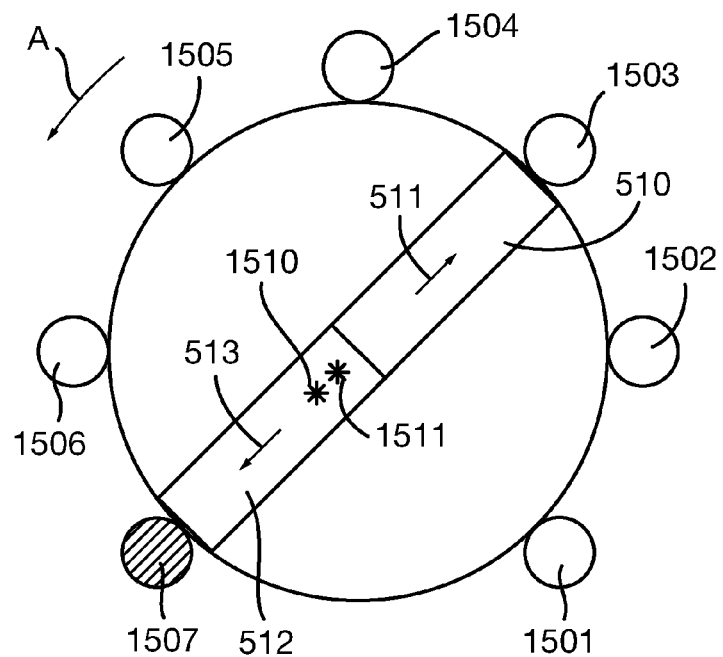
FIG. 15b is a further schematic view of a batching system arrangement for use in the second and third embodiments of the invention.

FIGS. 15a and 15b illustrate how such a double batch conveyor system is used to increase the efficiency of transporting bulk batches from the weigher. FIG. 15a schematically shows seven filling stations 1501-1507 and two batch conveyors 510, 512. Filling station 1507 is designated as a "bulk" station for receiving bulk batches. In the view of FIG. 15a, conveyor 510 is aligned with filling station 1501 and conveyor 512 is aligned with filling station 1505. The conveyor system moves anti-clockwise as indicated by arrow A, from one filling station to the next.

In FIG. 15a, batch conveyor 510 is running in direction 511, whereas batch conveyor 512 is not actuated and is not running. If the weigher 204 weighs a bulk batch, door 512a in timing hopper 520 will open and deposit a batch on stationary conveyor 512. When a correctly weighed batch is deposited onto conveyor 510 it will be transported to filling station 1501.

The batch conveyor system then moves anti-clockwise such that conveyor 510 is aligned with filling station 1502 and conveyor 512 is aligned with filling station 1506. Batch conveyor 512 remains stationary such that any bulk batches measured by the weigher are directed onto conveyor 512 as before. This means that bulk batches accumulate on conveyor 512.

When a batch has been transported to filling station 512, the conveyor system moves anti-clockwise again such that batch conveyor 510 is aligned with filling station 1503 and batch conveyor 512 is aligned with bulk station 1507, as seen in FIG. 15b. As batch conveyor 512 is now aligned with bulk station 1507, conveyor 512 is actuated and runs in direction 513. Bulk batches 1510, 1511 which were stored on conveyor 512 are then transported to bulk station 1507. Of course, the number of bulk batches stored on conveyor 512 is dependent on the product input to the weigher during the time conveyor 512 is stationary and whether a suitable size batch can be produced. The conveyor 512 is only actuated when aligned with the bulk station 1507 and is stationary (i.e. does not run) at other times.

Alternatively, when a bulk batch is deposited onto conveyor 512 when it is not aligned with the bulk station 1507, the conveyor 512 runs for a short, predetermined period of time such that the deposited bulk batch is moved a predetermined distance along the conveyor 512. This means that if more than one bulk batch is deposited from the weigher onto the conveyor 512, the batches are indexed at a predetermined spacing along the conveyor 512, as illustrated in FIG. 15b. This ensures that bulk batches do not accumulate and cause blockages before they are transported to the designated bulk station 1507.

Although in the above description conveyor 512 is described as the stationary conveyor only actuated when aligned with the bulk station, the system is flexible such that conveyor 510 may be used as the stationary conveyor and conveyor 512 used to transport good batches to be packaged. This change can be effected immediately and is advantageous in order to ensure that good batches are transported to filling stations in the most efficient manner. For example, the running modes of the conveyors 510, 512 may be swapped if some of the operators need a break and the only usable filling stations are on one side of the system which are accessible more easily by one conveyor.

In one embodiment, each batch conveyor may be sloped from the weigher to the filling stations. In other words, the end of the batch conveyor where the batch is deposited is at a higher level as compared to the end of the batch conveyor where the batch is dropped through the via hole and into the filling station. This would further increase the speed at which the batches are transported from the weigher to the filling stations.

Figure 8A:
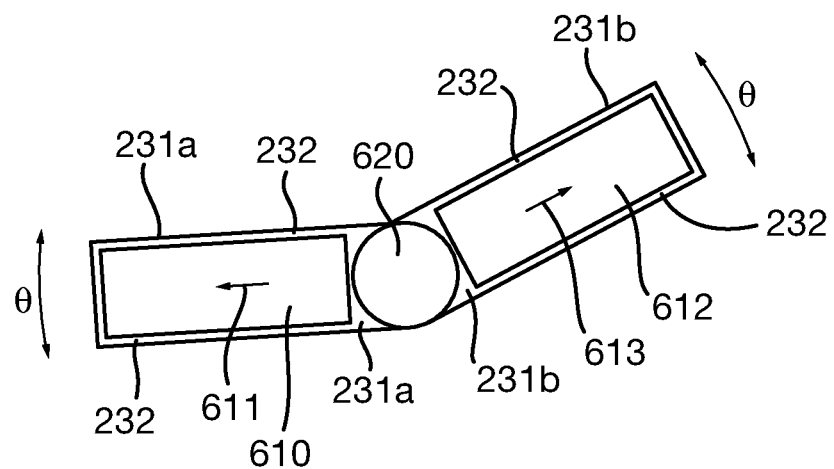
FIG. 8a is a schematic view of two independently rotatable conveyors according to a third embodiment of the present invention.
Figure 8B:
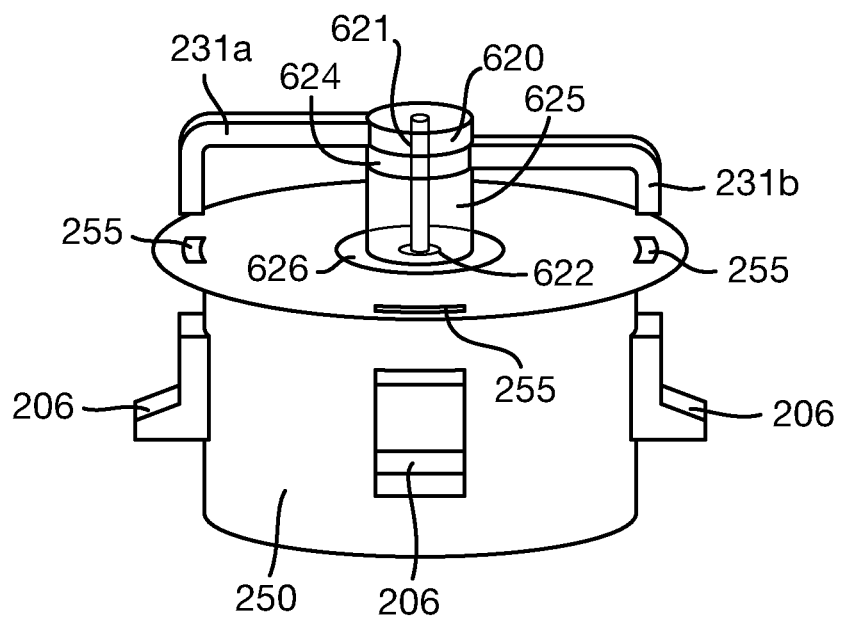
FIG. 8b is a further schematic view of two independently rotatable conveyors according to a third embodiment of the present invention.

In a further alternative embodiment, each batch conveyor is independently rotatable, as shown in FIGS. 8a and 8b. FIG. 8a shows a plan view of two independently adjustable batch conveyors 610 and 612. The weigher, circular plate, module, feed conveyor and batching table are omitted from this diagram for clarity. Batch conveyor 610 is supported by conveyor support 231a as in previous embodiments. Similarly, batch conveyor 612 is supported by conveyor support 231b. Protruding guides 232 are also present to assist in guiding the batches along the batch conveyor.

Although each batch conveyor 610, 612 is rotatable through 360°, the batching system is typically controlled such that batch conveyor 610 is rotatable through angle θ and conveyor 612 is rotatable through angle ø. Typically these angle ranges are separate and do not overlap, although any angle is accessible by at least one conveyor 610, 612. Support structure 231a supporting batch conveyor 610 is mounted on a first mounting disk 620 which is in turn mounted on spindle 621 (see FIG. 8b). Spindle 621 is then mounted on rotating plate 622. Support structure 231b supporting batch conveyor 612 is mounted on a second mounting disk 624 (see FIG. 8b) which in turn is mounted on spindle 625. Spindle 625 is then mounted on to rotating plate 626. This independent mounting of the conveyor supports allows for the independent rotation of batch conveyors 610 and 612. As seen in FIG. 8b, each of first mounting disk 620, second mounting disk 624, spindle 625 and rotating plate 626 are annular in form to accommodate spindle 621 and rotating plate 622. Rotating plates 622 and 626 are independently operable such that the batch conveyors 610 and 612 are independently rotatable. As can be seen from FIG. 8b, conveyor supports 231a and 231b are mounted at different heights, although in other embodiments the conveyors may be mounted so that they are at the same height. Other means of mounting the batch conveyors 610, 612 so that they are independently rotatable are envisaged.

As described above, each rotating plate 622, 626 is rotatable through 360°, although in one alternative embodiment each rotating plate is only rotatable through a limited range of degrees such that the angular positions available to batch conveyor 610 are different to those available to batch conveyor 612.

Each batch conveyor 610, 612 is independently controlled and each batch conveyor has specific filling stations associated with it. A control system (not shown) determines at which filling station a batch is required, and sends a signal to the weigher to deposit the correct weight batch into the timing hopper. The control system also sends a signal to the timing hopper 520 to open the correct door 510a, 510b such that the weighed batch is deposited onto the correct conveyor 610, 612 respectively. The batch conveyors 610, 612 are controlled by the control system such that the correct conveyor is rotated to the determined filling station.

In order that the batches are delivered from the timing hopper 520 to the correct conveyor, the timing hopper 520 rotates with in synchrony with the upper conveyor 610. Typically the timing hopper is connected to the upper conveyor 610. This ensures that a batch can be delivered to the conveyor 610 through door 510a at any angle of rotation of conveyor 610.

Figure 16A:
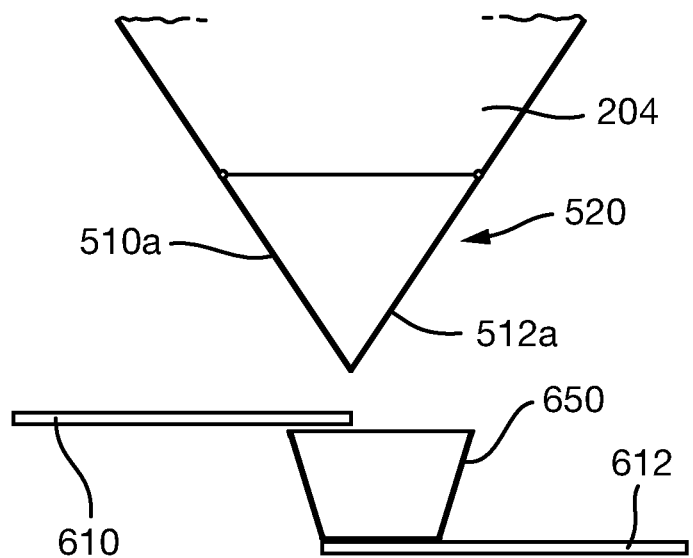
FIG. 16a is a schematic side view of a batching system arrangement according a third embodiment of the present invention.

However, as doors 510a and 512b oppose each other, and the conveyors 610, 612 are independently rotatable, the door 512b does not always align with conveyor 612 as the timing hopper 520 rotates with conveyor 610. The conveyor system therefore further comprises a guidance chute 650 mounted to the lower conveyor 612 at an end distal from the filling stations, and having a height smaller than the vertical distance between the upper conveyor 610 and the lower conveyor 612. This means that the guidance chute 650 is located vertically between the upper conveyor 610 and the lower conveyor 612, as seen in FIG. 16a. The guidance chute 650 has a large circular cross section as seen in the plan view in FIG. 16b such that a batch will be delivered from door 512a into the guidance chute 650 at any angle of rotation of the timing hopper 520. Other cross sectional geometries are envisaged however. Therefore, at any angle of rotation of the upper conveyor 610 and at any angle of rotation of the lower conveyor 612, a batch will be delivered to conveyor 610 through door 510a, and a batch will be delivered to conveyor 612 through door 512a.

Figure 16B:
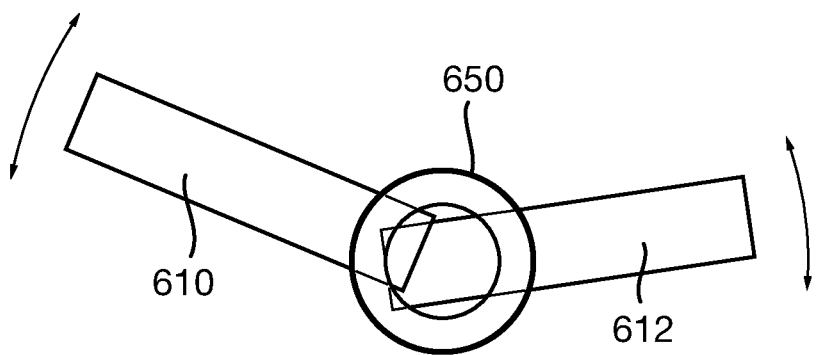
FIG. 16b is a plan view of a batching system arrangement according to a third embodiment of the invention.

In alternative embodiments, the guidance chute 650 is not mounted to the conveyor 612 and has an alternate mounting such that it is located between the upper and lower conveyors 610, 612 as illustrated in FIGS. 16a and 16b.

Alternative means for ensuring that door 510a corresponds to conveyor 610 and door 512a corresponds to conveyor 612 at all angles of rotation of the conveyor are envisaged. For example, separate timing hoppers for each conveyor 610, 612 may be used, or the lower conveyor 612 may have a much larger width at an end distal from the filling stations in order to receive batches from the timing hopper, with the conveyor 612 having a funnelled profile to guide the batch to the filling stations.

The control system ensures that batches are transported to the filling stations in a predetermined manner and at predetermined time intervals. The operators are expected to fill trays at a predetermined rate. Alternatively, signals can be sent manually by the operators at the filling stations indicating that they require a batch. In yet another alternative, sensors in the filling stations may determine when a batch is required at that filling station and send the appropriate signals to the weigher, timing hopper and conveyors.

Both batch conveyors 610, 612 run in the direction from the centre of their respective rotating plate 622 and 626 toward the outer edge of circular plate 254. In the arrangement of FIG. 8a, batch conveyor runs in direction 611, and batch conveyor 612 runs in direction 613.

The use of two independently rotatable and independently controllable conveyors 610 and 612 allows for greater flexibility in the transport of batches from the weigher to the filling stations. This is particularly advantageous when the weigher is configured to weigh two different batch weights. For instance, the first conveyor 610 may be used to transport batches of a first weight, and conveyor 612 may be used to transport batches of a second weight. Alternatively, one of the conveyors 610, 612 may be used to accumulate bulk batches before transporting them to a bulk station, as described above in relation to FIGS. 15a and 15b. Other arrangements with more than two independently rotatable conveyors are envisaged.

The embodiment seen in FIGS. 8a and 8b may also comprise a bulk conveyor or adapted bulk station as discussed hereinabove.

Figure 9A:
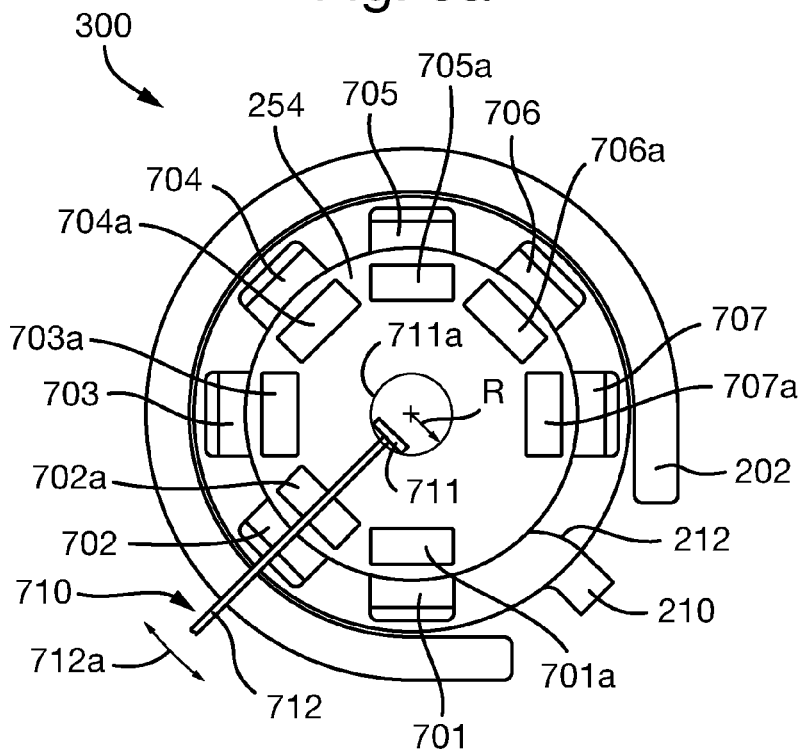
FIG. 9a is a plan view of a batching system according to a fourth embodiment of the present invention, showing the pushers in more detail.

In a further embodiment, instead of comprising at least one batch conveyor, the batching system comprises a pusher 710, as seen in FIG. 9a. FIG. 9a shows a plan view of a batching system 300 similar to those seen in FIGS. 4 and 6. The weigher is omitted for clarity purposes. In batching system 300, there is a plurality of filling stations 206 (here labelled 701-707) positioned around the circumference of module 250. An incomplete annular batching table 202 and annular feed conveyor 208 are provided as in the previous embodiments. Like reference numerals in the figures indicate like components.

Batching system 300 comprises circular plate 254 containing a plurality of via holes 701a to 707a positioned around its circumference corresponding to the plurality of filling stations. A pusher 710 comprising pushing surface 711 and rod 712 is mounted such that it lies on top of and parallel to the plane of circular plate 254, with the pushing surface 711 located at a position radially offset by a distance R from the centre of the circular plate 254. The pushing surface is rectangular in shape, although other shapes such as a circle or a square are envisaged.

The rod 712 is mounted substantially perpendicular to the pushing surface such that it extends radially towards the circumference of the pushing plate. The distal end of the rod 712a to the pushing surface is mounted to a rod mechanism such that said distal end 712a is movable around the circumference of the circular plate (see FIGS. 9 and 10). This means that the angular position of the pushing surface 711 also changes. Since the pushing surface 711 is offset from the centre of the circular plate 254, when the distal end of the rod 712a is moved around the circumference of the circular plate 254, the pushing surface traces a circular trajectory 711a round the centre of the pushing plate 254, and in a manner that the pushing surface 711 always faces the centre of pushing plate 254. In FIG. 9a, for example, the pushing surface 711 is facing the filling station 706.

Figure 9B:
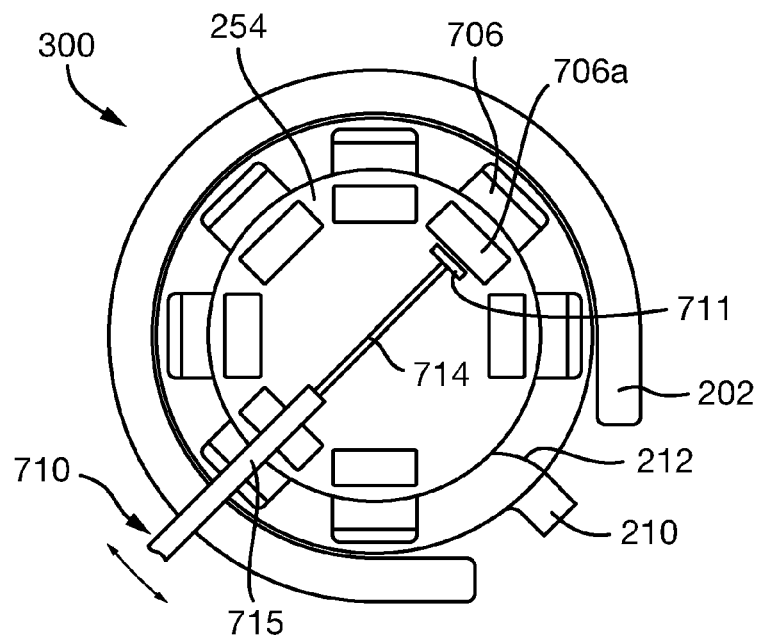
FIG. 9b is a plan view of a batching system according to a fourth embodiment of the present invention, showing the pushers in more detail.

In use, a weighed batch is deposited from onto the centre of circular plate 254. The distal end of the rod 712a is then rotated around the circumference of the circular plate 254 until the pushing surface 711 is facing the desired filling station. The rod is comprised of at least two coaxial cylindrical elements 714, 715 (see FIG. 9b) such that it is extendable along its length in the radial direction of the pushing plate 254. When the pushing surface is in the correct orientation and facing the desired filling station, the rod extends due to elements 714, 715, pushing the batch towards the corresponding via hole of the filling station. The batch falls through the via hole and into the holding hopper of the filling station. The pusher 710 in its extendable position is seen in FIG. 9b. As seen in FIG. 9b, element 714 has a smaller radius than element 715, and is slidably movable in and out of element 714, allowing extension and retraction of rod 712. The elements 714, 715 may be part of a pneumatic piston system, for example, or alternatively driven by an electronically actuated motor.

The rod 712 then retracts as element 714 retracts inside element 715, and the pushing plate 711 returns to its original position offset from the centre of circular plate 254. The next weighed batch is deposited onto the centre of the circular plate and the process starts again, with the distal end 712a of the rod being rotated to the desired location. As is now clear to see, the pushing surface is offset from the centre of the circular plate such that the deposited batch is always located between the pushing surface 711 and the desired via hole. The radius R is chosen such that it is larger than the size of a batch in order that the deposited batches do not get snagged on the pushing surface.

In a batching system 300 as seen in FIG. 9a and FIG. 9b, one of the filling stations may be dedicated to being a bulk station. For example, the filling station 707 seen in FIG. 9a may be dedicated to this role. As described above, any food product which has not been able to be weighed by the weigher into a set weight batch will be classed as "bulk". When such bulk is deposited on to circular plate 254, the pusher will then push the bulk into filling station 707 in the manner explained above. Where a filling station is dedicated to receiving bulk, it is modified slightly. For example, it will not have a presentation tray 206a, and instead will comprise a larger holding hopper. The bulk can then either be recycled to be weighed, or sold as bulk product.

In alternative embodiment, the batching system further comprises a rotatable chute (not shown) which is angled such that a batch is deposited into the chute from the weigher and exits the chute onto the plate 254 off-centre. The batch is then pushed to the desired filling station by the pusher as described above. For example, in the arrangement of FIG. 9a, if a batch is desired to be transported to filling station 706, it will be deposited on to the circular plate at a radial position between the centre of the plate 254 and via hole 706a. The pusher 710 then operates as described above in order to push the batch to via hole 706a. Batches of food product can typically leave messy and unhygienic residue on the plate 254 when being pushed, especially sticky food product such as chicken. Depositing the batches on to the plate 254 off-centre and closer to the via holes advantageously minimises the amount of residue and increases the cleanliness of the system.

Figure 10:
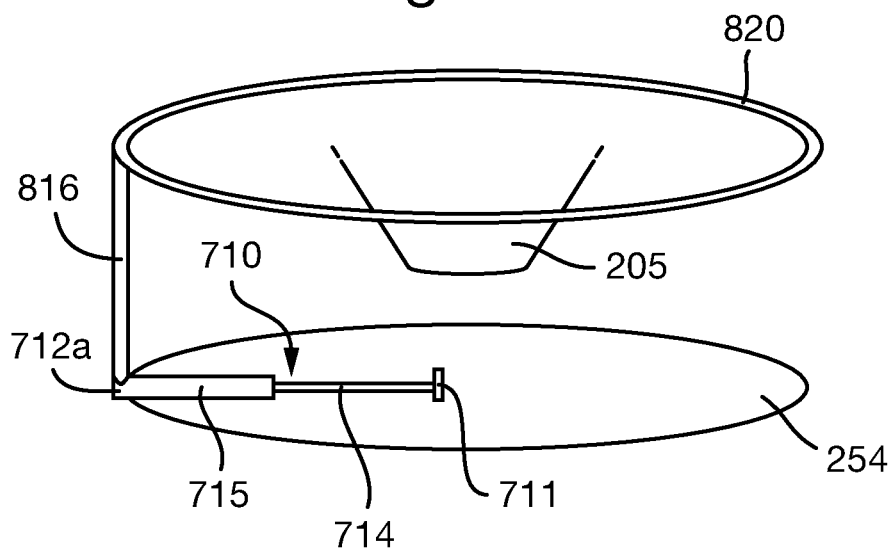
FIG. 10 is a schematic view of the pushers according to a fifth embodiment of the present invention.

FIG. 10 shows the rod mechanism according to one embodiment of the invention. An annular rail 820 is positioned surrounding weigher chute 205. Guiding rod 816 is coupled to annular rail such that the guiding rod 816 can move along the circumference annular rail. Such couplings are well known in the art and will not be discussed further herein.

Coupling rod 816 is rigidly fixed to the distal end 712a of the rod such that when the guiding rod moves around annular rail 820, the pusher 710 is rotated as described in relation to FIGS. 7a and 7b. Although the pusher rod 712 shown in FIG. 10 comprises coaxial elements 714, 715 as described above, pusher rod 712 may in fact comprise a single rigid element. In such an embodiment, guiding rod 816 is hinged about rail 820 such that guiding rod 816 can swing in a radial direction, causing pusher 710 to move radially across the circular plate 254.

Figure 11:
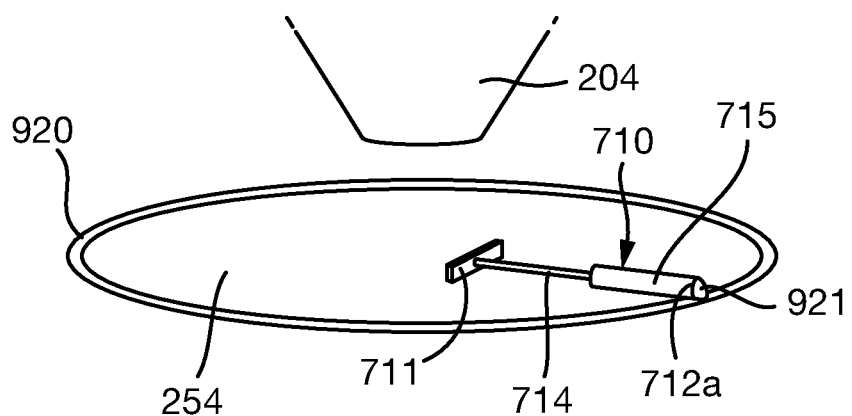
FIG. 11 is a schematic view of the pushers according to a sixth embodiment of the present invention.

In another embodiment, a rail 920 is positioned around the circumference of circular plate 254, as seen in FIG. 11. The distal end of the rod 712a is coupled to rail 920 through a ball bearing or the like 921. The distal end of the rod 712a is moveable around the circumference of the circular plate, thus rotating pusher 710 in the manner described in relation to FIGS. 9a and 9b. In this embodiment, the "pushing" motion is from the coaxial rod elements 714, 715 as described above. The embodiment as seen in FIG. 11 is advantageously more compact than that seen in FIG. 10 and requires fewer moving parts, thus improving durability.

In one embodiment, the rod mechanism allows pusher 710 to rotate through all available angles. In another embodiment, the rod mechanism allows rotation in discrete steps corresponding to the filling station positions. For example, in FIG. 9a, the rod 712 is currently over filling station 702. If it rotates clockwise such that the rod is over filling station 704, it will have moved through two discrete "positions".

Figure 12:
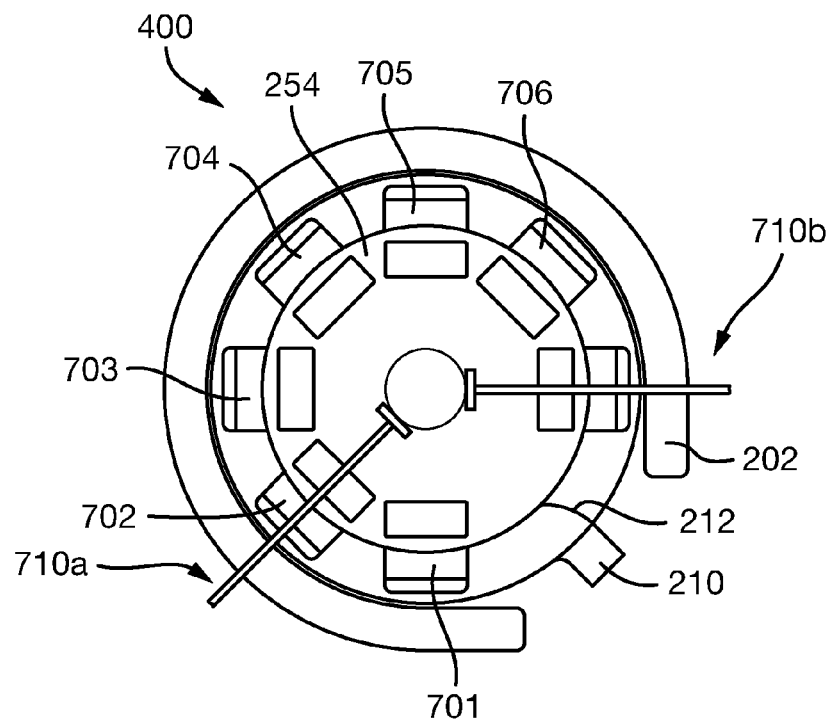
FIG. 12 is a plan view of a batching system according to a seventh embodiment of the present invention, showing the pushers in more detail.

FIG. 12 shows a plan view of a batching system 400 similar to the batching system 300 seen in FIGS. 9a and 9b. However, in this embodiment there are two pushers 710a and 710b. The particular rod mechanism used is not shown in this figure for clarity. The use of two pushers 710a, 710b in this embodiment advantageously increases the speed at which deposited batches can be transported to their required filling stations. For example, in FIG. 12, if the next deposited batch is required at filling station 701, pusher 710*b* will be rotated two positions anti-clockwise. If only the single pusher 710*a* was present, it would have had to move three positions clockwise in order to push the batch as required. Therefore the presence of the second pusher advantageously increases throughput of the system 400.

Although FIG. 12 only shows two pushers 710*a*, 710*b*, it is envisaged that there may be more than two pushers in any one system. This is especially useful when there are a large number of filling stations. Alternatively, in a further embodiment, the pushers remain in fixed positions and the plate rotates.

Figure 13:
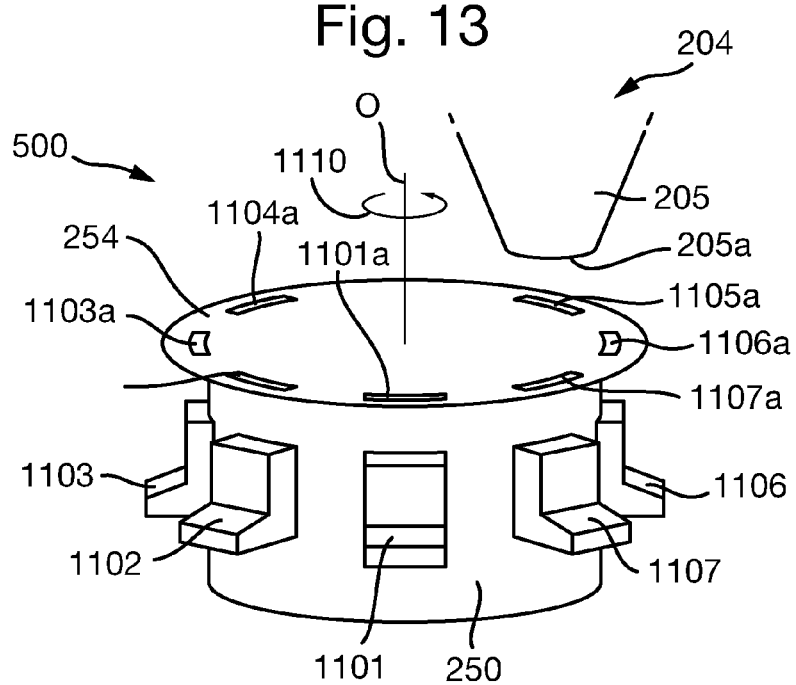
FIG. 13 is a schematic view of the offset weigher chute according to an eighth embodiment of the present invention.

FIG. 13 shows a batching system 500 according to a further embodiment of the invention. The feed conveyor and batching table are omitted for clarity purposes. As can be seen in the figure, the batching system 500 comprises a plurality of filling stations 1101-1107 positioned around a cylindrical module 250. A circular plate 254 is mounted on top of module and has a radius larger than that of the module such that the circular plate overhangs the module, as in the previous embodiments. The circular plate 254 comprises a plurality of via holes 1101*a*-1107*a* corresponding to the plurality of filling stations. Like reference numerals throughout the figures correspond to like parts.

The batching system 500 comprises a chute 205 attached to the exit of the weigher and offset from the centre of plate 254 such that the chute opening 205*a* is at the same radial position as the plurality of via holes. In FIG. 13 for example, the chute opening is located over via hole 1107*a* such that when the weighed batch is deposited it will fall straight from the weigher through chute opening 205*a*, through via hole 1107*a* and into the holding hopper of filling station 1107. In this particular instance the chute is a separate article to the weigher, although alternatively the chute may be an integral part of the weigher.

When the chute is rotated about the axis O, the opening 205*a* traces a circular path at the same radius as the via holes such that is passes over each of the via holes. For example, if the chute is rotated in the direction indicated by arrow 1110, the chute opening 205*a* will pass over via hole 1106*a*, 1105*a* and so on. Of course, the chute could be rotated in the opposite direction. The chute can be rotated in a continuous manner, or in discrete steps corresponding to the angular separation of the filling stations.

Preferably, the spacing between the chute 205 and circular plate 254 is minimised to reduce any damage to the batches as they fall through via holes and land in the filling stations. This also minimises any unhygienic and wasteful splashing of product.

This batching system 500 has the advantage that it reduces the number of moving parts in the batching system, thereby increasing its durability. The time to transport batches from the weigher to the filling stations is also reduced, increasing throughput. Further, with the lack of any conveyors or pushers to transport the batches, there is a reduced hygiene issue, as food cannot get stuck on the abovementioned moving parts. This is especially the case for sticky food products such as chicken.

Figure 14A:
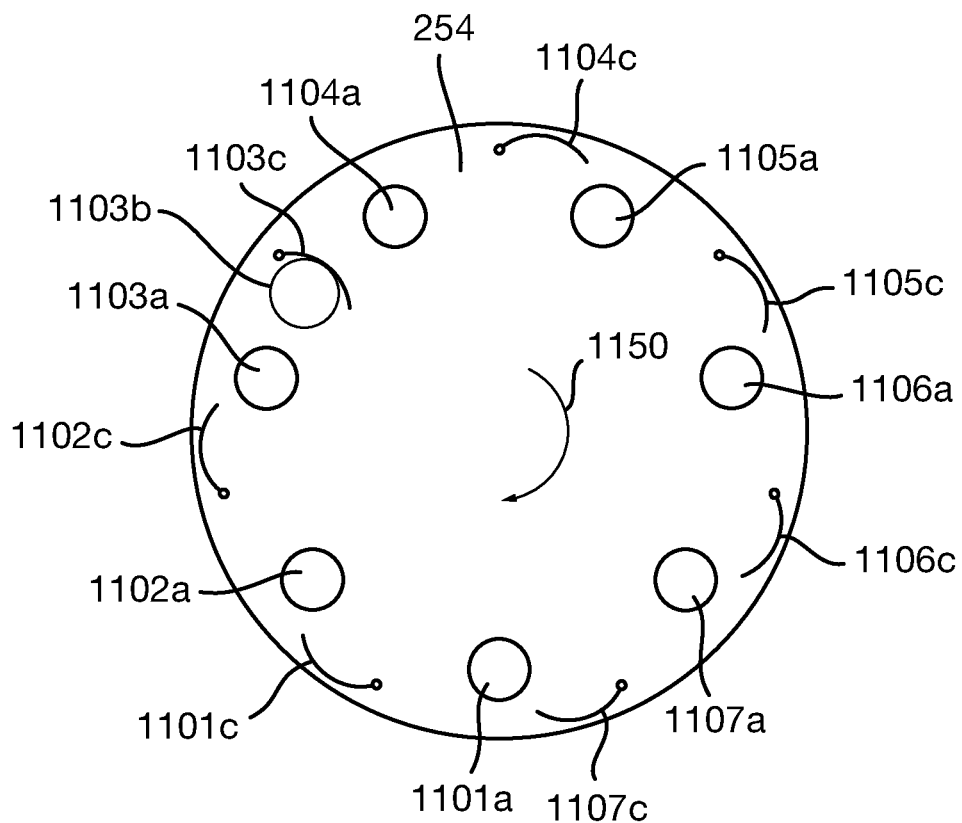
FIG. 14a is a plan view of a batching system according to a ninth embodiment of the present invention.

In a further embodiment, the circular plate 254 is mounted on a rotatable spindle (not shown) such that is rotates. This is illustrated in FIG. 14*a*, which depicts a plan view of the circular plate according to this embodiment. The weigher 204 and offset chute 205 have been omitted for clarity purposes. Here, the circular plate rotates in the direction illustrated by arrow 1150. As in the previously described embodiments, the number of via holes 1101*a*-1107*a* corresponds to the number of filling stations 1101-1107 located beneath the circular plate. The via holes in FIG. 14*a* are circular, however it will be appreciated that the via holes could have any shape such that batches of food product are able to fall through them into the filling stations beneath.

In FIG. 14*a*, the rotatable circular plate 254 is at an angular position such that the via holes are not aligned with the filling stations below. The following description will relate to transporting a batch to a single filling station 1103 for ease of understanding.

When a batch is required at filling station 1103, a weighed batch is deposited from the offset chute 205 to batch drop point 1103*b*. Drop point 1103*b* is positioned directly over filling station 1103. As can be seen from FIG. 14*a*, when a batch is deposited on to the drop point, the rotatable circular plate is at an angular position such that the via holes 1101-1107 are not aligned with the holding hoppers of the filling stations beneath. This means that the batch is deposited on to the circular plate 254.

Figure 14B:
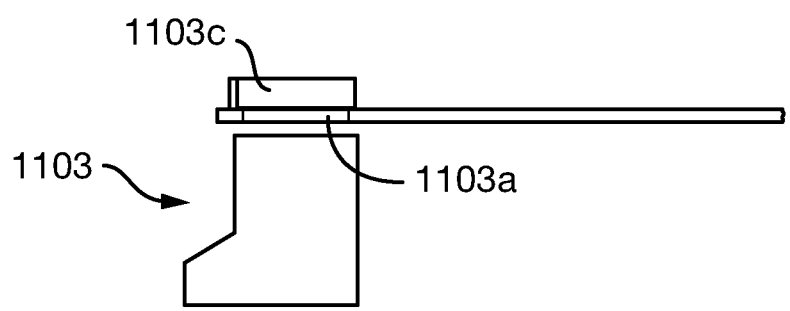
FIG. 14b is a schematic view of a batching system according to a ninth embodiment of the present invention.

A curved scraper 1103*c* is then actuated to rotate about hinge 20 to an activated position illustrated by the position of scraper 1103 in FIG. 14*a*. This is performed by a pneumatic system, although alternatively the scraper may be electronically actuated. The scraper 1103 is stationary with respect to the rotation of the plate and is positioned slightly above the plane of the plate 254, as seen in FIG. 14*b*. There is a slight gap between the plate 254 and the scraper to allow the scraper to rotate freely about hinge 1120.

The activated position of the scraper is such that as the plate 254 rotates in the direction 1150, it stops the batch deposited at drop point 1103*b* from moving any further on the rotatable plate. Therefore, as the plate 254 continues to rotate, the via hole 1103*a* passes under the batch such that the batch falls through the via hole 1103*a* and into filling station 1103. In plan form the scraper has a curved shape matching that of the via hole to easily guide the batch through the via hole. However, other shapes are envisaged, such as a straight scraper.

Each filling station 1101-1107 has its own respective scraper 1101*c*-1107*c*, as seen in FIG. 14*a*. Here, each of scrapers 1104*c*, 1105*c*, 1106*c*, 1107*c*, 1101*c* and 1102*c* are shown in their un-activated positions at a greater radial distance than the plurality of via holes. When a batch is required at a certain filling station, the batch will be deposited through the offset chute 205 to the correct drop point, and the respective scraper will be actuated to rotate to its actuated position. In other embodiments, the scrapers are lowered into position when required from above the plane of the circular plate 254.

Due to the rotation of the circular plate, a batch can be delivered to a filling station through any via hole. For example, a batch may be delivered to filling station 1103 through via hole 1107*a* depending on the timing of when batches are required. As in previous embodiments, a control system (not shown) controls the weigher and chute to provide batches to the correct drop points at the correct time. This is either done at predetermined time intervals, or in response to a signal from a filling station indicating that a batch is required at that filling station.

The circular plate 254 in the present embodiment is shown rotating in direction 1150. However, the plate 254 may rotate in the opposite direction, in which case the scrapers are "reversed" in orientation accordingly. In one embodiment the scrapers are straight when viewed in plan form, such that the rotatable plate may reverse direction without requiring the scrapers to be changed. This advantageously increases the flexibility of the system and allows batches to be transported to filling stations more quickly.

The above description describes a number of different embodiments. The features of each embodiment may be used in combination with features from the other embodiments.

Although the above embodiments have been described primarily in relation to chicken, it will be understood that the batching system of the present invention may be used for other in relation to other food products, such as beef, lamb, bread and confectionary. Further, the present invention may be utilised in relation to non-food products, such as screws, nails and other mechanical items, health and beauty products, and toys.

The invention claimed is:

1. A batching system for use in a food packaging system, said batching system comprising:
    a plurality of filling stations;
    means for transporting predefined batches provided from a delivery position to at least one of said plurality of filling stations;
    a multihead weigher operable to provide food product in said predefined batches at the delivery position; and
    a batching table having the plurality of filling stations, the filling stations being positioned substantially equidistantly around an axis of a predefined delivery position.

2. The batching system of claim 1, wherein the multihead weigher is a screw-feed multihead weigher.

3. The batching system of claim 1, wherein the filling stations are positioned circumferentially around a substantially circular batching table.

4. The batching system of claim 3, wherein the substantially circular batching table is coaxial with the axis of the predefined delivery position.

5. The batching system of claim 1, wherein the batching table is an incomplete annulus.

6. The batching system of claim 1, wherein each filling station comprises at least one holding hopper for holding a batch.

7. The batching system of claim 1, wherein the means for transporting said batches comprises a rotatable batch conveyor positioned between the weigher and the plurality of filling stations for transporting said batches provided from the weigher to any of said plurality of filling stations.

8. The batching system of claim 7, wherein the weigher is positioned above the plane of the filling stations and the batch conveyor is positioned between the weigher and filling stations such that batches are deposited on to the batch conveyor from the weigher at the predefined delivery position.

9. The batching system of claim 7, wherein the batch conveyor is operable to transport said batches to the at least one filling station one batch at a time.

10. The batching system of claim 7, further comprising a bulk conveyor operable to receive at least one bulk batch from the batch conveyor.

11. The batching system of claim 1, wherein the batching system further comprises a delivery member for receiving batches from the multihead weigher, and the means for transporting said batches comprises a rotatable conveyor system positioned between the multihead weigher and the filling stations, said delivery member arranged so as to deposit batches received from the multihead weigher on to the rotatable conveyor system;
    said rotatable conveyor system comprising a first batch conveyor and a second batch conveyor operable to transport batches to any of the plurality of filling stations;
    and wherein in a first mode the delivery member is configured to deposit batches on the first batch conveyor and in a second mode the delivery member is configured to deposit batches on the second batch conveyor.

12. The batching table of claim 11, wherein the delivery member rotates in synchrony with the rotatable conveyor system.

13. The batching table of claim 11, wherein the delivery member is coupled to the rotatable conveyor system.

14. The batching system of claim 11, wherein the first batch conveyor is operable to transport batches to any of a first set of one or more filling stations, and the second batch conveyor is operable to transport batches to any of a second set of one or more filling stations.

15. The batching system of claim 14, wherein the second batch conveyor is actuated only upon alignment with one of the second set of filling stations.

16. The batching system of claim 14, wherein when the second batch conveyor is aligned with one of the first set of filling stations, said second batch conveyor is operable to transport a batch a predetermined distance, wherein said predetermined distance is less than a distance between the delivery member and one of the first set of filling stations;
    and wherein when the second batch conveyor is aligned with one of the second set of filling stations, said second batch conveyor is operable to transport a batch to the filling station with which it is aligned.

17. The batching system of claim 11, wherein the delivery member is a timing hopper comprising an entry port, a first closable opening arranged to deposit batches on the first batch conveyor and a second closable opening arranged to deposit batches on the second batch conveyor, and wherein the entry port is positioned at the delivery position.

18. The batching system of claim 11, wherein the multihead weigher is positioned above the plane of the filling stations and the rotatable conveyor system is positioned between the multihead weigher and the filling stations.

19. The batching system of claim 11, wherein the first and second batch conveyors are independently rotatable.

20. The batching system of claim 11, further comprising a bulk conveyor operable to receive at least one bulk batch from the conveyor system.

21. The batching system of claim 1, wherein the means for transporting said batches comprises a plate positioned between the multihead weigher and the plurality of filling stations, said plate further comprising at least one moveable pusher operable to push a batch from the plate to a filling station.

22. The batching system of claim 21, wherein the multihead weigher is positioned above the plane of the filling stations and the plate is positioned between the multihead weigher and filling stations such that batches are deposited on to the plate from the multihead weigher at the delivery position.

23. The batching system of claim 21, wherein the plate is a circular plate, and said at least one pusher lies parallel to the plane of said circular plate; the pusher being extendable in a radial direction so as to push a batch from the plate to a filling station.

24. The batching system of claim 1, wherein the means for transporting said batches comprises a rotatable chute coupled to the multihead weigher, said chute having an entry port and an exit port and arranged so as to transport batches received from the multihead weigher to any of the plurality of filling stations through the exit port, and wherein the entry port is positioned at the delivery position.

25. The batching system of claim 24, wherein, in use, rotation of the chute positions the exit port above at least one filling station, such that a batch is transported from the weigher to said filling station.

26. The batching system of claim 24, further comprising a rotatable plate positioned between the multihead weigher and the filling stations, said plate comprising at least one via hole and a plurality of moveable scraper blades corresponding to the plurality of filling stations, and wherein rotation of the chute positions the exit port above the rotatable plate at a position above a filling station, and wherein the corresponding movable scraper blade is arranged so as to deflect the batch from the plate to the filling station through the via hole.

27. The batching system of claim 26, wherein the rotatable plate comprises a plurality of via holes corresponding to the number of filling stations.

28. The batching system of claim 1, further comprising a feed conveyor operable to transport containers filled with food product away from the batching system.

29. The batching system of claim 1, wherein the feed conveyor is concentric to and adjacent the batching table.

30. The batching system of claim 1, further comprising a bulk station positioned adjacent the batching table and located such that the means for transporting said batches provided from the multihead weigher to at least one of said plurality of filling stations is operable to transport bulk batches from the multihead weigher to the bulk station.

31. A food packaging system comprising the batching system of claim 1.

32. A method of transporting batches of food product from a multihead weigher to at least one of a plurality of filling stations, the method comprising operating a batching system according to claim 1.

* * * * *